United States Patent
Sameshima et al.

(10) Patent No.: US 10,703,028 B2
(45) Date of Patent: Jul. 7, 2020

(54) IN-MOLD FOAM MOLDED ARTICLE, METHOD FOR FORMING THE SAME, AND MOLD FOR USE IN FORMING THE SAME

(71) Applicant: Kaneka Corporation, Osaka (JP)

(72) Inventors: Masahiko Sameshima, Osaka (JP); Yuki Tobimatsu, Osaka (JP); Takayuki Ebina, Osaka (JP)

(73) Assignee: KANEKA CORPORATION, Osaka (JP)

( * ) Notice: Subject to any disclaimer, the term of this patent is extended or adjusted under 35 U.S.C. 154(b) by 238 days.

(21) Appl. No.: 15/672,869

(22) Filed: Aug. 9, 2017

(65) Prior Publication Data

US 2017/0334106 A1     Nov. 23, 2017

Related U.S. Application Data

(63) Continuation of application No. PCT/JP2016/057401, filed on Mar. 9, 2016.

(30) Foreign Application Priority Data

Mar. 26, 2015    (JP)  ................................ 2015-064956

(51) Int. Cl.
     *B29C 44/12*      (2006.01)
     *B29C 44/56*      (2006.01)
     (Continued)

(52) U.S. Cl.
    CPC ........ *B29C 44/128* (2013.01); *B29C 44/1204* (2013.01); *B29C 44/1266* (2013.01); *B29C 44/1271* (2013.01); *B29C 44/445* (2013.01); *B29C 44/5627* (2013.01); *B32B 5/18* (2013.01); *B29C 44/58* (2013.01); *B29K 2023/06* (2013.01); *B29K 2023/065* (2013.01); *B29K 2023/0608* (2013.01); *B29K 2023/0625* (2013.01);
     (Continued)

(58) Field of Classification Search
None
See application file for complete search history.

(56) References Cited

U.S. PATENT DOCUMENTS

2006/0145490 A1*   7/2006   Yamaguchi  ............. B60R 19/18
                                                                      293/109

FOREIGN PATENT DOCUMENTS

JP         H02-144221 A      6/1990
JP         H02-144222 A      6/1990
                (Continued)

OTHER PUBLICATIONS

International Search Report issued in International Application No. PCT/JP20161057401; dated May 31, 2016 (2 pages).

*Primary Examiner* — Nathan T Leong
(74) *Attorney, Agent, or Firm* — Osha Liang LLP

(57) ABSTRACT

An in-mold foam molded article has a foam body made from olefin-based resin pre-expanded beads and an insert member having an elongated connecting portion and movement resisting portions provided apart from one another in the elongated connecting portion. The insert member is subjected to insert molding upon in-mold foam molding using the olefin-based resin pre-expanded beads. The foam body has a movement facilitating structure that facilitates relative movement between the insert member and the foam body during shrinkage of the in-mold foam molded article after release from a mold.

12 Claims, 18 Drawing Sheets

(51) Int. Cl.
  *B29C 44/44*    (2006.01)
  *B32B 5/18*    (2006.01)
  *B29K 23/00*    (2006.01)
  *B29L 31/58*    (2006.01)
  *B60N 2/70*    (2006.01)
  *B29C 44/58*    (2006.01)
  *B60J 3/02*    (2006.01)

(52) U.S. Cl.
  CPC ................ *B29K 2023/0633* (2013.01); *B29K 2023/0641* (2013.01); *B29K 2023/12* (2013.01); *B29L 2031/58* (2013.01); *B60J 3/0204* (2013.01); *B60N 2/7017* (2013.01)

(56) References Cited

FOREIGN PATENT DOCUMENTS

| | | |
|---|---|---|
| JP | H02-144223 A | 6/1990 |
| JP | H05-124714 A | 5/1993 |
| JP | H08-156002 A | 6/1996 |
| JP | 2000-254992 A | 9/2000 |
| JP | 2001161508 A | 6/2001 |
| JP | 2008-229978 A | 10/2008 |
| JP | 2011-16458 A | 1/2011 |
| JP | 2015-136851 A | 7/2015 |
| JP | 2015-174340 A | 10/2015 |
| JP | 2016-60064 A | 4/2016 |
| KR | 20110062951 | * 8/2012 |

* cited by examiner

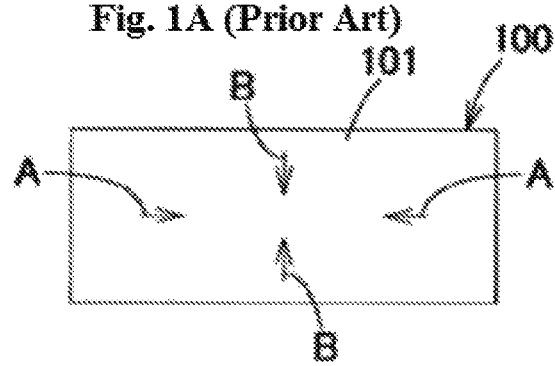
Fig. 1A (Prior Art)
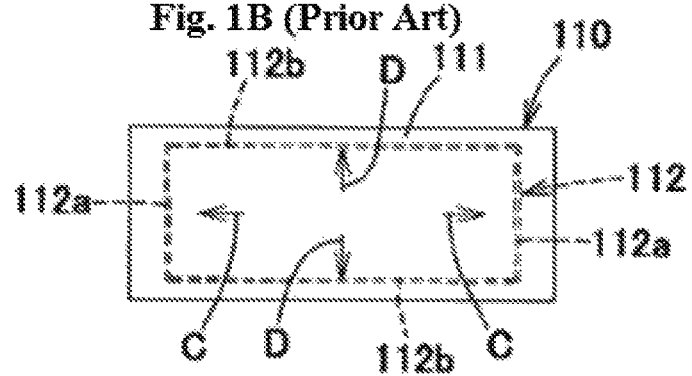
Fig. 1B (Prior Art)
Fig. 2
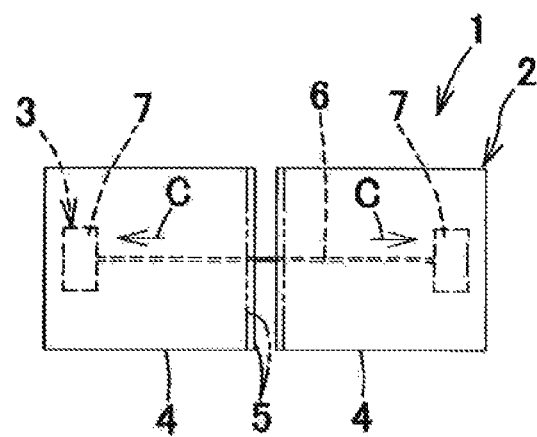

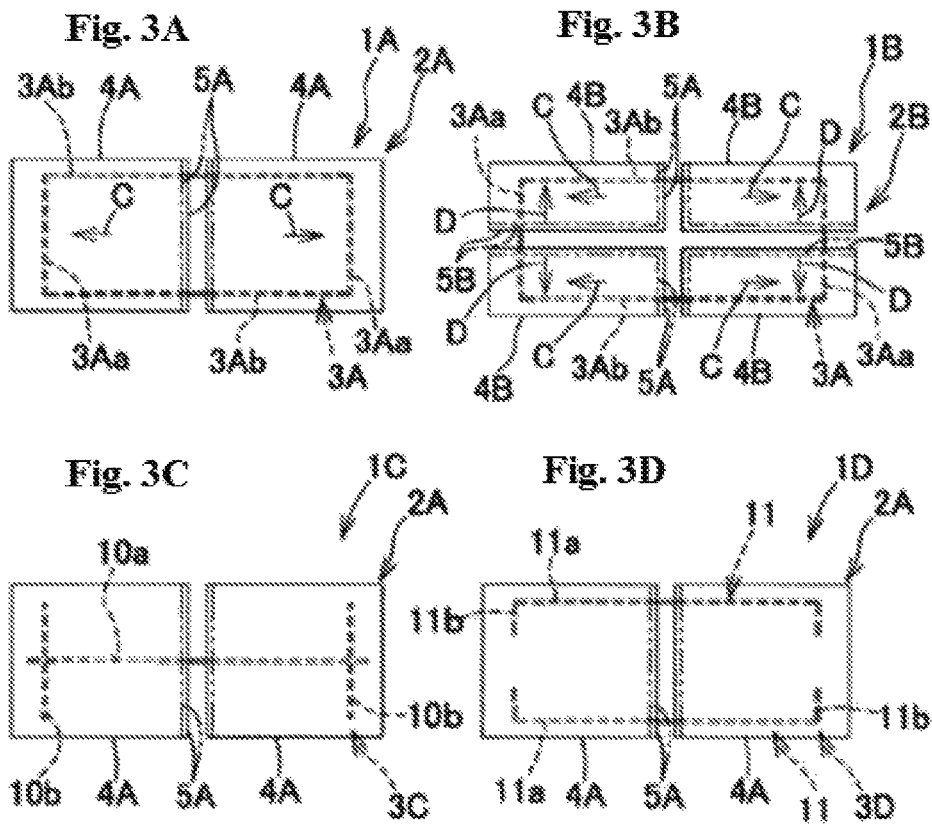
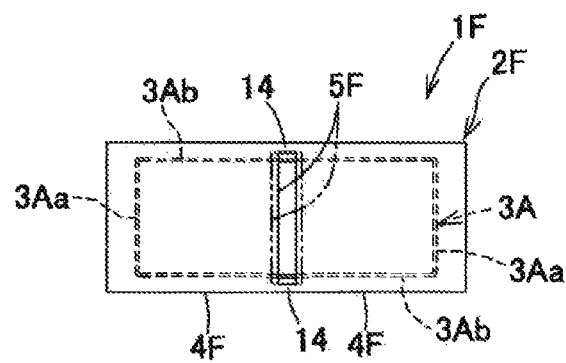

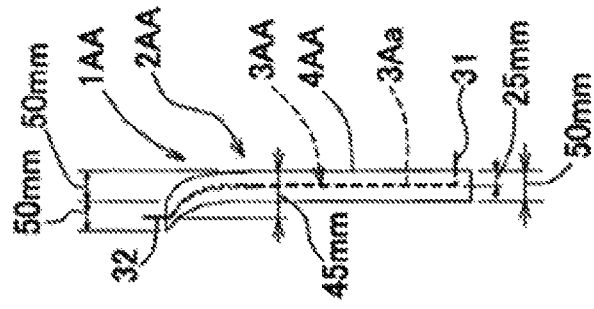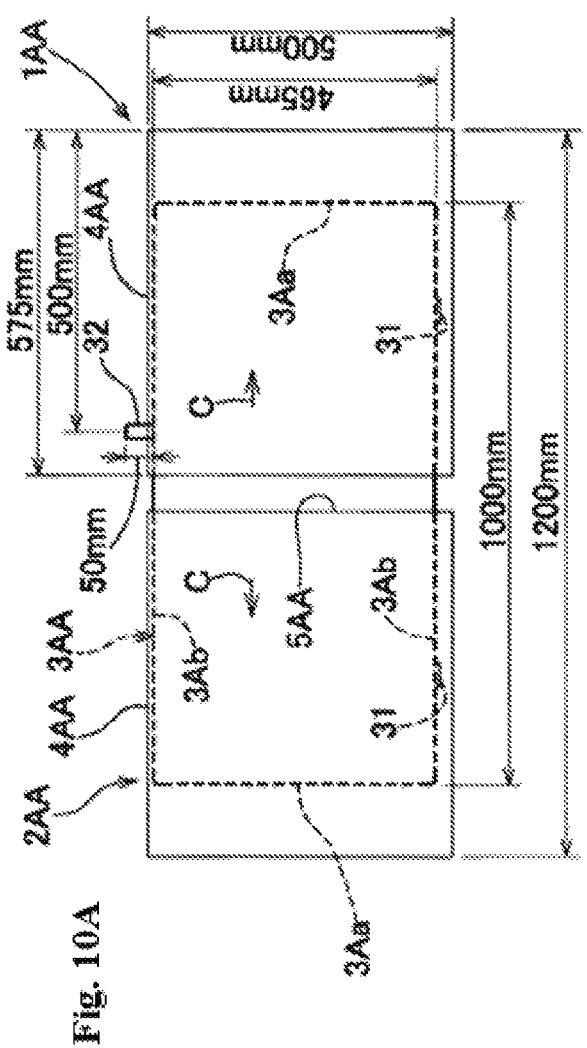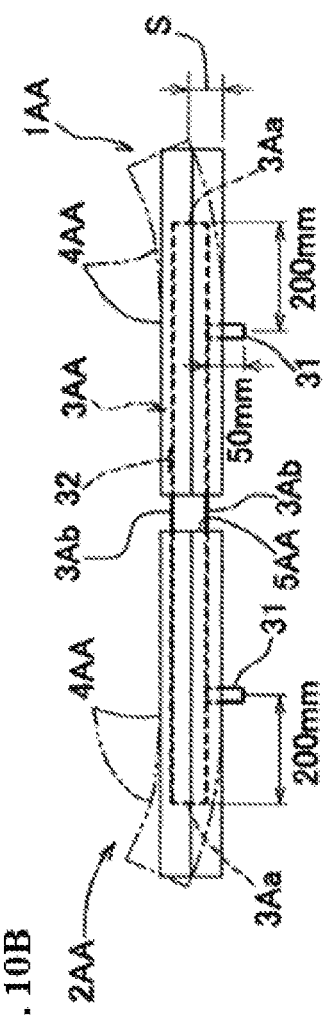

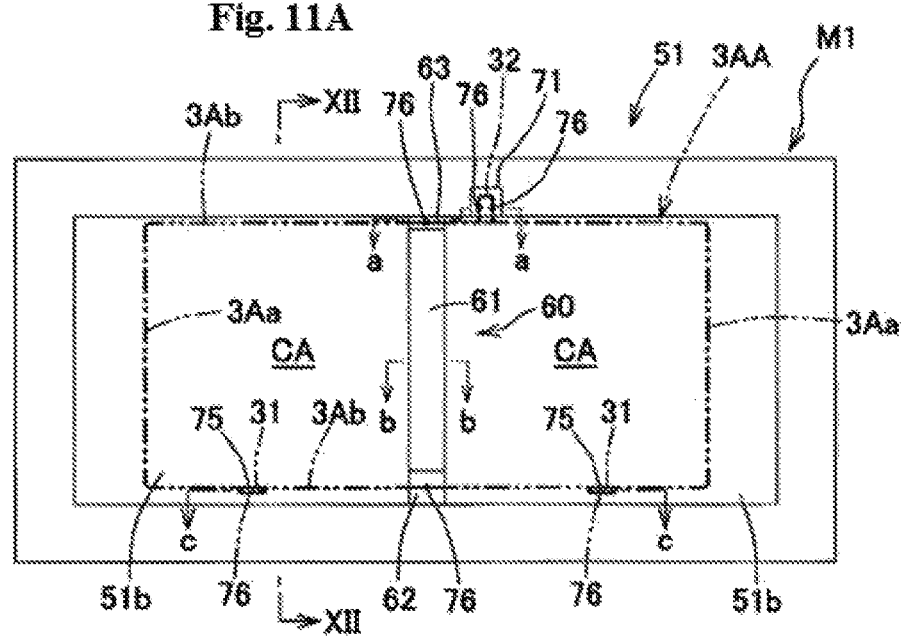
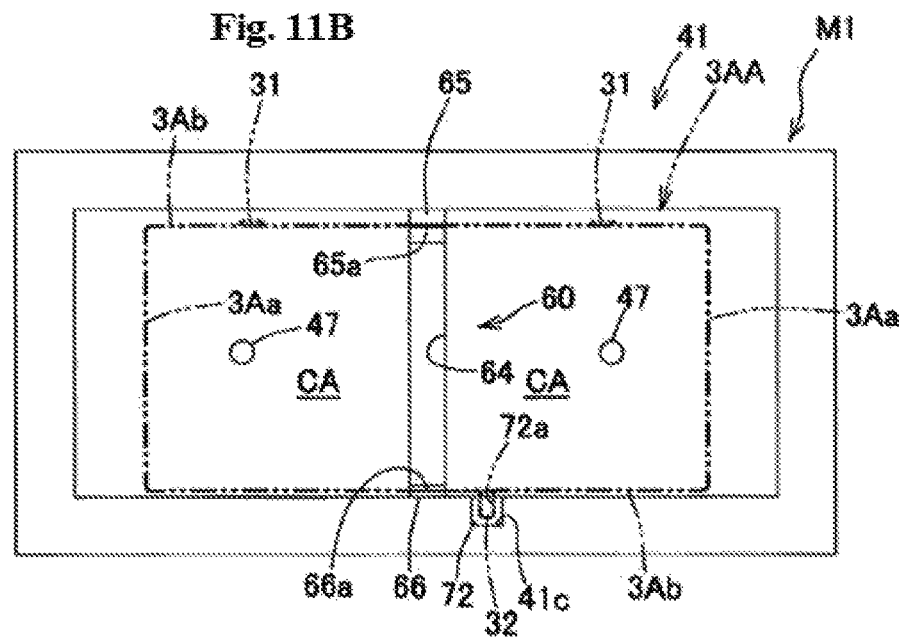

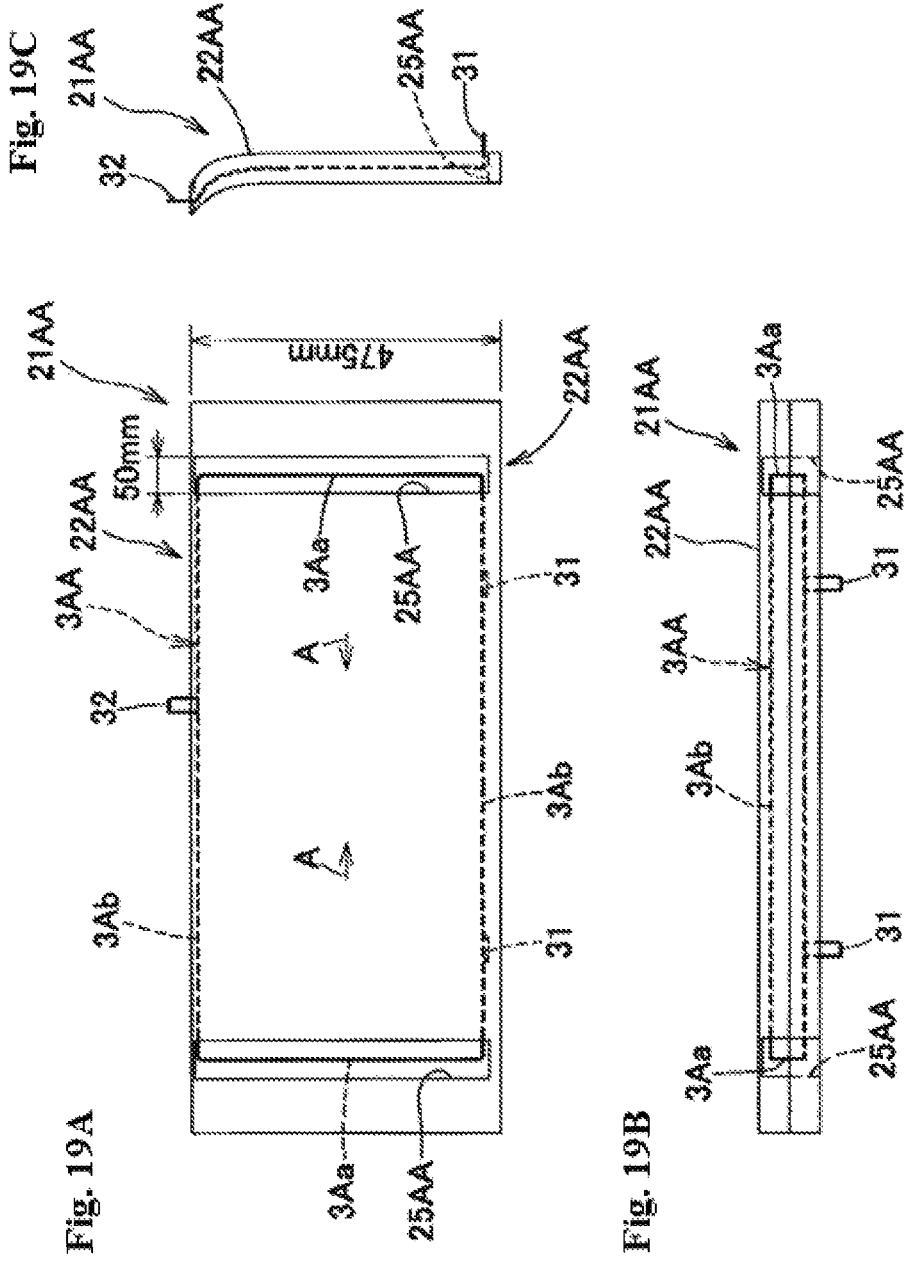

IN-MOLD FOAM MOLDED ARTICLE, METHOD FOR FORMING THE SAME, AND MOLD FOR USE IN FORMING THE SAME

TECHNICAL FIELD

One or more embodiments of the present invention relate to an in-mold foam molded article including a foaming molded body and an insert member embedded in and integrated with the foaming molded body. One or more embodiments of the present invention also relate to a method for forming such an in-mold foam molded article, and to a mold for use in forming such an in-mold foam molded article.

BACKGROUND

For the purpose of reducing the number of parts and providing high performance for parts, attention is being given to integral molding of a plastic foam with a metal part or any other material for forming car-related components. For example, a car sun visor is proposed, which includes: a rigid article formed by molding foamed resin particles; and a frame-shaped core material that is formed by bending a copper-plated copper wire and embedded as an insert member in the rigid article (see, for example, Patent Literatures 1 to 3). For car headrests or armrests, insert molding is proposed, in which a synthetic resin molded article and bead foaming body are integrally molded (see, for example, Patent Literatures 4 and 5). Conventionally, car seat core materials have been also usually produced by integral molding in which a metal wire for shape stabilization is embedded in a polyurethane seat body. However, a structure formed of a combination of polyurethane and a polyolefin-based resin foam body is proposed for vehicle weight reduction, cost saving, and other purposes (see, for example, Patent Literature 6).

CITATIONS LIST

Patent Literature 1: Japanese Unexamined Patent Application Publication No. 02-144221
Patent Literature 2: Japanese Unexamined Patent Application Publication No. 02-144222
Patent Literature 3: Japanese Unexamined Patent Application Publication No. 02-144223
Patent Literature 4: Japanese Unexamined Patent Application Publication No. 05-124714
Patent Literature 5: Japanese Unexamined Patent Application Publication No. 08-156002
Patent Literature 6: Japanese Unexamined Patent Application Publication No. 2001-161508

SUMMARY

If a molded article consists only of a foaming molded body formed by a single resin, the molded article released from the mold will transiently shrink overall and then return to its original size overall. In this case, the molded article will not significantly warp. However, if a foaming molded body is combined with other materials or if a core material such as a metal wire is inserted into a foaming molded body by insert molding, the difference in shrinkage rate between the foaming molded body and the insert member can cause the molded article to warp. As illustrated in FIG. 1A, a pure in-mold foam molded article 100 consisting only of, for example, a rectangular flat plate-shaped foam body 101, which is formed with no insert, will shrink overall toward the central side as indicated by the arrows A and B when the vapor in the cells is cooled after in-mold foam molding and release from the mold, and then will return to its original size when the outside air is introduced into the cells. However, as illustrated in FIG. 1B, if an in-mold roam molded article 110 is formed by insert molding in which a frame-shaped metal insert member 112 is inserted into a foam body 111, the shrinkage of the foam body 111 in the direction of the arrow A (see FIG. 1A) will be inhibited by the transverse portions 112a of the insert member 112, and the shrinkage of the foam body 111 in the direction of the arrow B (see FIG. 1A) will also be inhibited by the longitudinal portions 112b of the insert member 112, during the shrinkage of the in-mold foam molded article 110 after the release from the mold. Therefore, the foam body 111 will shrink in the directions indicated by the arrows C and D in FIG. 1B and will not completely return to its original size, so that the in-mold foam molded article 110 may warp toward the front or back surface side along the directions of the arrows C and D.

In a relatively large molded article such as a seat cushion core material for vehicles, the total amount of warping will be large, which may hinder the attachment of the article to a car body, which may cause the article to be rejected.

One or more embodiments of the present invention provide an in-mold foam molded article that can be formed with improved dimensional accuracy while the occurrence of warping is suppressed, to provide a method for forming such an in-mold foam molded article, and to provide a mold for use in forming such an in-mold foam molded article.

One or more embodiments of the present invention are directed to an in-mold foam molded article including: a foam body including olefin-based resin pre-expanded beads; and an insert member including an elongated connecting portion and movement resisting portions provided apart from one another in the connecting portion, the insert member being subjected to insert molding upon in-mold foam molding using the olefin-based resin pre-expanded beads; in which the foam body has a movement facilitating structure that facilitates relative movement between the insert member and the foam body during shrinkage of the in-mold foam molded article after release from a mold. As used herein, the term "movement resisting portion" means a portion that is more resistant than the connecting portion, in movement of the foam body in the longitudinal direction or the connecting portion during shrinkage of the in-mold foam molded article after the release from the mold.

The in-mold foam molded article has an insert member including an elongated connecting portion and movement resisting portions provided apart from one another in the connecting portion. For a conventional in-mold foam molded article with no movement facilitating structure, relative movement between the insert member and the foam body is inhibited by the movement resisting portions during shrinkage of the foam body after the in-mold foam molded article is released from the mold, so that warping will occur in the in-mold foam molded article as the foam shrinks toward the movement resisting portion side and after the shrinking, the foam portion between the movement resisting portions will not completely return to its original size. In contrast, according to one or more embodiments of the present invention, the movement facilitating structure, which is provided to the foam body to facilitate relative movement between the insert member and the foam body, will facilitate relative movement between the insert member and the foam body during shrinkage of the foam body after the release of the in-mold foam molded article from the mold, and alter the shrinking, the movement facilitating structure will also facilitate relative movement between the insert member and the foam body when the foam body returns to the original size. Therefore, after the release from the mold, the shrinking action of the foam body and the action of returning to the original shape go smoothly, which makes it possible to suppress or prevent the occurrence of warping in the in-mold foam molded article and to improve the dimensional accuracy of the in-mold foam molded article.

In one or more embodiments, the movement facilitating structure includes dividing surfaces that are provided along a direction crossing the connecting portion, and divide the foam body into a plurality of divided foam parts. The movement facilitating structure with such features will facilitate relative movement between the connecting portion of the insert member and the foam body to suppress or prevent the occurrence of warping in the in-mold foam molded article. After the in-mold foam molded article is released from the mold, the space between the dividing surfaces expands as the foam body shrinks so that the divided foam parts each independently shrink smoothly along the connecting portion toward the movement resisting portion side. In addition, after the shrinking, the space between the dividing surfaces contracts as the divided foam parts return to their original shape so that the divided foam parts each independently return smoothly to their original shape. After the release from the mold, therefore, the shrinking action of the divided foam parts and the action of returning to their original shape go smoothly, which makes it possible to suppress or prevent the occurrence of warping in the in-mold foam molded article. In this regard, the adjacent divided foam parts may be separated from each other completely. Within the acceptable warping range of the in-mold foam molded article, however, the adjacent divided foam parts may be partially separated so as to be connected to each other at least partially.

In one or more embodiments, the movement facilitating structure includes a movement allowing space that allows relative movement between the foam body and each of the movement resisting portions. The movement facilitating structure with such features will allow relative movement between the foam body and the movement resisting portions of the insert member to suppress or prevent the occurrence of warping in the in-mold foam molded article. After the in-mold foam molded article is released from the mold, each the movement resisting portions is allowed to move in the movement allowing space as the foam body shrinks, so that the foam body smoothly shrinks along the connecting portion. In addition, after the shrinking, each the movement resisting portions is also allowed to move in the movement allowing space as the foam body returns to the original shape so that the foam body returns smoothly to the original shape along the connecting portion. After the release from the mold, therefore, the shrinking action of the foam body and the action of returning to the original shape go smoothly, which makes it possible to suppress or prevent the occurrence of warping in the in-mold foam molded article.

In one or more embodiments, the movement facilitating structure includes: dividing surfaces that are provided along a direction crossing the connecting portion, and divide the foam body into a plurality of divided foam parts; and a movement allowing space that allows relative movement between the foam body and each of the movement resisting portions.

In one or more embodiments, the insert member has a portion completely exposed to the outside between the dividing surfaces opposed to each other, when the movement facilitating structure is formed to divide the foam body into a plurality of divided foam parts. These features make it possible for the divided foam parts to smoothly shrink and then return to the original shape after the release from the mold, so that warping can be more effectively reduced in the in-mold foam molded article. In addition, the insert member inserted in the in-mold foam molded article can be easily visually observed through the space between the dividing surfaces.

In one or more embodiments, when the movement allowing space has a size for allowing each of the movement resisting portions to be placed therein before and after shrinkage of the in-mold foam molded article after release from a mold. According to these features, the shrinkage of the foam body after the release of the in-mold foam molded article from the mold can be reliably prevented from being inhibited by the movement resisting portions. There is difficulty in setting the size of the movement allowing space to a constant value because the size of the movement allowing space varies with the size, material, expansion ratio of the foam body, the shrinkage rate of the foam body before and after cooling after the release from the mold, the size, material, and thermal expansion coefficient of the insert member, the conditions for forming the in-mold foam molded article, and other factors. The movement allowing space may have any size as long as each movement resisting portion can be placed in the movement allowing space after the in-mold foam molded article is formed and cooled. The upper limit of the size of the movement allowing space may be set as small as possible, taking into account, for example, the strength and appearance of the in-mold foam molded article 21. In one or more embodiments, the movement allowing space has a size allowing each of the movement resisting portions to be entirely exposed to the outside before and after shrinkage of the in-mold foam molded article after the molding. These features make it possible for the foam body to smoothly shrink and then return to the original shape after the release from the mold, and also make it possible to prevent the movement resisting portions from inhibiting the shrinking and returning to the original shape, so that warping can be more effectively reduced in the in-mold foam molded article.

In one or more embodiments, the insert member has a loop-shaped portion. The insert member may be a member consisting of a loop with any of various shapes, such as a regular square, a rectangle, or any other square shape, or a circle or an ellipse, or the insert member may be a member including a loop-shaped portion to which a hook or hooks or other members are attached.

One or more embodiments of the present invention may also encompass the following aspects.

(1) An in-mold foam molded article including: a foam body including olefin-based resin pre-expanded beads; and an insert member including an elongated connecting portion and movement resisting portions provided apart from one another in the connecting portion, the insert member being subjected to insert molding upon in-mold foam molding using the olefin-based resin pre-expanded beads, in which the foam body has a movement facilitating structure that facilitates relative movement between the insert member and the foam body during shrinkage of the in-mold foam molded article after release from a mold, and the insert member has a portion completely exposed to outside in the movement facilitating structure.

(2) An in-mold foam molded article including: a foam body including olefin-based resin pre-expanded beads; and an insert member including an elongated connecting portion and movement resisting portions provided apart from one another in the connecting portion, the insert member being subjected to insert molding upon in-mold foam molding using the olefin-based resin pre-expanded beads, in which the foam body has a movement facilitating structure that facilitates relative movement between the insert member and the foam body during shrinkage of the in-mold foam molded article alter release from a mold, the movement facilitating structure includes dividing surfaces that are provided along a direction crossing the connecting portion, and divide the foam body into a plurality of divided foam parts, and the insert member has a portion completely exposed to outside between the dividing surfaces opposed to each other.

(3) An in-mold foam molded article including: a foam body including olefin-based resin pre-expanded beads; and an insert member including an elongated connecting portion and movement resisting portions provided apart from one another in the connecting portion, the insert member being subjected to insert molding upon in-mold foam molding using the olefin-based resin pre-expanded beads, in which the foam body has a movement facilitating structure that facilitates relative movement between the insert member and the foam body during shrinkage of the in-mold foam molded article after release from a mold, the movement facilitating structure includes a movement allowing space that allows relative movement between the foam body and each of the movement resisting portions, and the movement allowing space has a size for allowing each or the movement resisting portions to be entirely exposed to the outside before and after shrinkage of the in-mold foam molded article after the molding.

(4) An in-mold foam molded article including: a foam body including olefin-based resin pre-expanded beads; and an insert member including an elongated connecting portion and movement resisting portions provided apart from one another in the connecting portion, the insert member being subjected to insert molding upon in-mold foam molding using the olefin-based resin pre-expanded beads, in which the foam body has a movement facilitating structure that facilitates relative movement between the insert member and the foam body during shrinkage of the in-mold foam molded article after release from a mold, the movement facilitating structure includes: dividing surfaces that are provided along a direction crossing the connecting portion and divide the foam body into a plurality of divided foam parts, the insert member having a portion completely exposed to outside between the dividing surfaces opposed to each other; and a movement allowing space that allows relative movement between the foam body and each of the movement resisting portions, and has a size for allowing each of the movement resisting portions to be entirely exposed to the outside before and after shrinkage of the in-mold foam molded article after the molding.

Deformation or warping may be relatively large depending on the shape of the in-mold foam molded article, if the portion of the insert member is not completely exposed to the outside in the movement facilitating structure, for example, if at least part of the insert member between the opposed dividing surfaces is not exposed to the outside in the in-mold foam molded article of the aspect (2) or if the movement allowing space does not have a size that allows at least part of the movement resisting portions in the in-mold foam molded article of the aspect (3) is not exposed to the outside before and alter shrinkage of the in-mold foam molded article after the molding.

One or more embodiments of the present invention may also be directed to a first in-mold foam molding method including: providing an insert member including an elongated connecting portion and movement resisting portions provided apart from one another in the connecting portion; subjecting olefin-based resin pre-expanded beads and the insert member to in-mold insert foam molding to form an in-mold foam molded article that includes the insert member and a foam body formed from the pre-expanded beads, and dividing the foam body into a plurality of divided foam parts by dividing surfaces along a direction crossing the connecting portion during the molding.

In the first in-mold foam molding method, the foam body is divided into a plurality of divided foam parts by dividing surfaces along a direction crossing the connecting portion during the molding. Therefore, after the in-mold foam molded article is released from the mold, the space between the dividing surfaces expands as the foam body shrinks so that the divided foam parts each independently shrink smoothly along the connecting portion toward the movement resisting portion side. In addition, after the shrinking, the space between the dividing surfaces contracts as the divided foam parts return to their original shape so that the divided foam parts each independently return smoothly to their original shape. After the release from the mold, therefore, the shrinking action or the divided foam parts and the action of returning to their original shape go smoothly, which makes it possible to suppress or prevent the occurrence of warping in the in-mold foam molded article.

One or more embodiments of the present invention may also be directed to a second in-mold foam molding method including: providing an insert member including an elongated connecting portion and movement resisting portions provided apart from one another in the connecting portion; subjecting olefin-based resin pre-expanded beads and the insert member to in-mold insert foam molding to form an in-mold foam molded article that includes the insert member and a foam body formed from the pre-expanded beads, and forming, in the foam body, a movement allowing space that allows relative movement between the foam body and each of the movement resisting portions during shrinkage of the in-mold foam molded article after release from a mold.

In the second in-mold foam molding method, a movement allowing space that allows relative movement between the foam body and each of the movement resisting portions is formed in the foam body during the molding. Therefore, after the in-mold foam molded article is released from the mold, each of the movement resisting portions is allowed to move in the movement allowing space as the foam body shrinks, so that the foam body smoothly shrinks along the connecting portion. In addition, after the shrinking, each of the movement resisting portions is also allowed to move in the movement allowing space as the foam body returns to the original shape so that the foam body returns smoothly to the original shape along the connecting portion. After the release from the mold, therefore, the shrinking action of the foam body and the action of returning to the original shape go smoothly, which makes it possible to suppress or prevent the occurrence of warping in the in-mold foam molded article.

In one or more embodiments of the second in-mold foam molding method, the foam body is divided into a plurality of divided foam parts by dividing surfaces along a direction crossing the connecting portion during the molding. According to this feature, after the release from the mold, the space between the dividing surfaces will also expand to facilitate relative movement between the insert member and the foam body, so that the occurrence of warping in the in-mold foam molded article can be more effectively suppressed or prevented.

In one or more embodiments of the first and second in-mold foam molding methods, the insert member used has a loop-shaped portion. The insert member may be a member consisting of a loop with any of various shapes, such as a regular square, a rectangle, or any other square shape, or a circle or an ellipse, or the insert member may be a member including a loop-shaped portion to which a hook or hooks or other members are attached.

One or more embodiments of the present invention may also be directed to a first mold for use in in-mold foam molding, for forming an in-mold foam molded article that includes: a foam body including olefin-based resin pre-expanded beads; and an insert member including an elongated connecting portion and movement resisting portions provided apart from one another in the connecting portion, the insert member being subjected to insert molding upon in-mold foam molding using the olefin-based resin pre-expanded beads, the mold including a dividing space-forming portion forming a dividing space between adjacent divided foam parts so as to divide the foam body into a plurality of divided foam parts by dividing surfaces provided along a direction crossing the connecting portion.

The first mold for use in in-mold foam molding has a dividing space-forming portion that forms a dividing space between adjacent divided foam parts so as to divide the foam body into a plurality of divided foam parts by dividing surfaces provided along a direction crossing the connecting portion. Similarly to the first in-mold foam molding method, therefore, the first mold makes it possible to suppress or prevent the occurrence of warping in the in-mold foam molded article.

One or more embodiments of the present invention may also be directed to a second mold for use in in-mold foam molding, for forming an in-mold foam molded article that includes: a foam body including olefin-based resin pre-expanded beads; and an insert member including an elongated connecting portion and movement resisting portions provided apart from one another in the connecting portion, the insert member being subjected to insert molding upon in-mold foam molding using the olefin-based resin pre-expanded beads, the mold including a movement allowing space-forming portion forming, in the foam body, a movement allowing space for allowing relative movement between the foam body and each of the movement resisting portions.

The second mold for use in in-mold foam molding has a movement allowing space-forming portion that forms, in the foam body, a movement allowing space for allowing relative movement between the foam body and each of the movement resisting portions. Similarly to the second in-mold foam molding method, therefore, the second mold makes it possible to suppress or prevent the occurrence of warping in the in-mold foam molded article.

In one or more embodiments, the second mold for use in in-mold foam molding further has a dividing space-forming portion for forming a dividing space between adjacent divided foam parts so as to divide the foam body into a plurality of divided foam parts by dividing surfaces provided along a direction crossing the connecting portion. According to this feature, after the release from the mold, the space between the dividing surfaces will also expands to facilitate relative movement between the insert member and the foam body, so that the occurrence of warping in the in-mold foam molded article can be more effectively suppressed or prevented.

In one or more embodiments of the first and second molds for used in in-mold foam molding, the insert member has a loop-shaped portion. The insert member may be a member consisting of a loop with any of various shapes, such as a regular square, a rectangle, or any other square shape, or a circle or an ellipse, or the insert member may be a member including a loop-shaped portion and a hook or hooks or other members attached thereto.

The in-mold foam molded article according to one or more embodiments of the present invention has the movement facilitating structure that is provided in the foam body to facilitate relative movement between the insert member and the foam body. After the in-mold foam molded article is released from the mold, the movement facilitating structure will facilitate relative movement between the insert member and the foam body during shrinkage of the foam body, and after the shrinking, the movement facilitating structure will also facilitate relative movement between the insert member and the foam body when the foam body returns to the original size. Therefore, after the release from the mold, the shrinking action of the foam body and the action of returning to the original shape go smoothly, which makes it possible to suppress or prevent the occurrence of warping in the in-mold foam molded article and to improve the dimensional accuracy of the in-mold foam molded article.

When the first in-mold foam molding method and the first mold according to one or more embodiments of the present invention are used in in-mold foam molding, the foam body is divided into a plurality of divided foam parts by dividing surfaces along a direction crossing the connecting portion during the molding. Therefore, after the in-mold foam molded article is released from the mold, the space between the dividing surfaces expands as the foam body shrinks so that the divided foam parts each independently shrink smoothly along the connecting portion toward the movement resisting portion side. In addition, after the shrinking, the space between the dividing surfaces contracts as the divided foam parts return to their original shape so that the divided foam parts each independently return smoothly to their original shape. After the release from the mold, therefore, the shrinking action of the divided foam parts and the action of returning to their original shape go smoothly, which makes it possible to suppress or prevent the occurrence of warping in the in-mold foam molded article.

When the second in-mold foam molding method and the second mold according to one or more embodiments of the present invention are used in in-mold foam molding, a movement allowing space that allows relative movement between the foam body and each of the movement resisting portions is formed in the foam body during the molding. Therefore, after the in-mold foam molded article is released from the mold, each of the movement resisting portions is allowed to move in the movement allowing spaces as the foam body shrinks, so that the foam body smoothly shrinks along the connecting portion. In addition, after the shrinking, each of the movement resisting portions is also allowed to move in the movement allowing space as the foam body returns to the original shape so that the foam body returns smoothly to the original shape along the connecting portion. After the release from the mold, therefore, the shrinking action of the foam body and the action of returning to the original shape go smoothly, which makes it possible to suppress or prevent the occurrence of warping in the in-mold foam molded article.

BRIEF DESCRIPTION OF DRAWINGS

FIGS. 1A and 1B are diagrams for illustrating the mechanism of warping after conventional in-mold foam molded articles are released from the mold.

FIG. 2 is a plan view of a first type in-mold foam molded article.

FIGS. 3A, 3B, 3C, and 3D are plan views of other first type in-mold foam molded articles having different insert structures.

FIG. 4 is a plan view of another first type in-mold foam molded article in which divided foam parts are partially connected to each other.

FIGS. 10A, 10B, and 10C are plan, front, right-side views of the in-mold foam molded article of FIG. 9.

FIG. 11A is a molding surface-side front view of the male mold part of a mold for forming the in-mold foam molded article of FIG. 9, and FIG. 11B is a molding surface-side front view of the female mold part of the mold for forming the in-mold foam molded article of FIG. 9.

FIGS. 19A, 19B, and 19C are plan, front, and right-side views of the in-mold foam molded article of FIG. 18.

DETAILED DESCRIPTION

Hereinafter, one or more embodiments of the present invention will be described with reference to the drawings.

First, the general structure of the in-mold foam molded article according to one or more embodiments of the present invention will be described with reference to FIGS. 2 to 8.

Figure 5A:
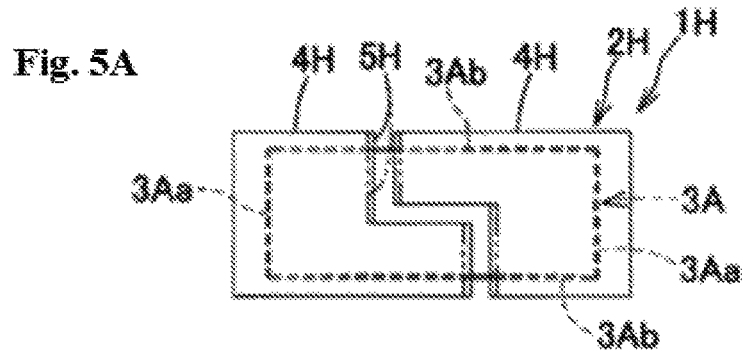
FIGS. 5A, 5B, 5C, and 5D are plan views of other first type in-mold foam molded articles having different dividing space shapes.
Figure 5B:
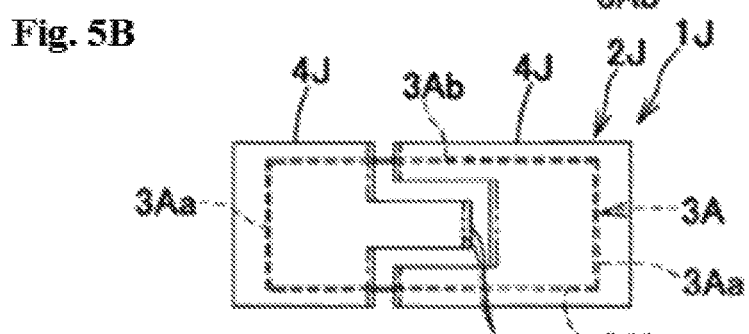
Figure 5C:
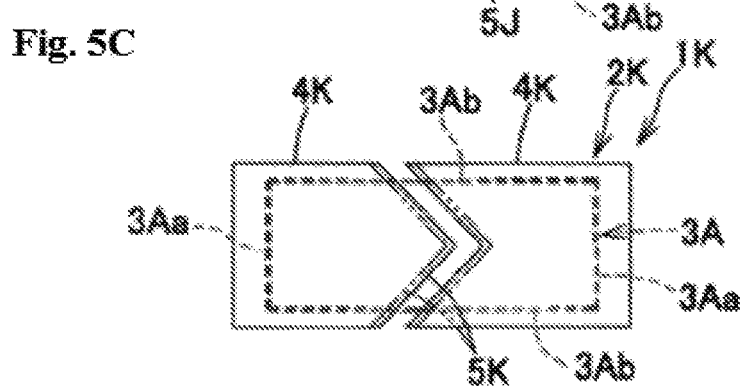
Figure 5D:
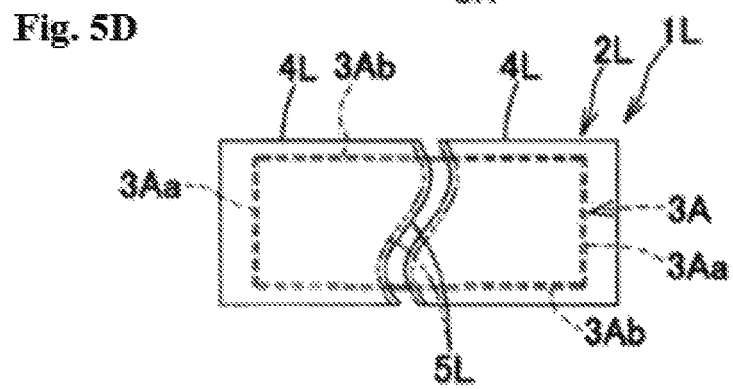
Figure 6:
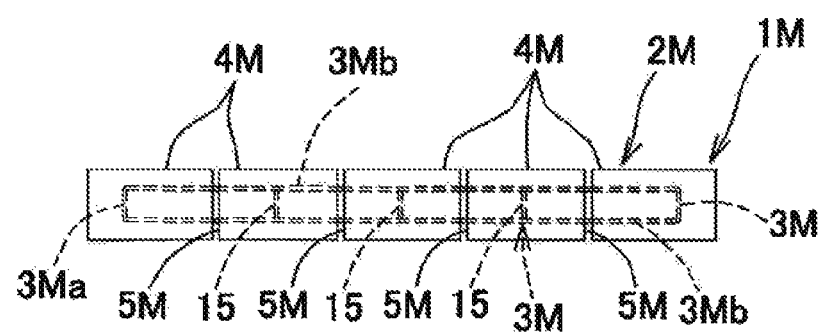
FIG. 6 is a plan view of another first type in-mold foam molded article having a different foam shape.
Figure 7:
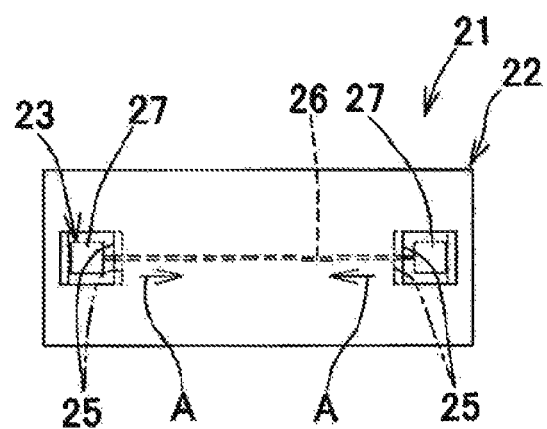
FIG. 7 is a plan view of a second type in-mold foam molded article.

The in-mold foam molded article according to one or more embodiments of the present invention can be broadly classified into a first type in-mold foam molded article 1 illustrated in FIGS. 2 to 6 and a second type in-mold foam molded article 21 illustrated in FIGS. 7 and 8. In the description, first type in-mold foam molded articles 1A to 1D, 1F, 1H, and 1J to 1M are generically called in-mold foam molded articles 1, and second type in-mold foam molded articles 21A to 21D are generically called in-mold foam molded articles 21.

(First Type In-Mold Foam Molded Article)

First, the first type in-mold foam molded article 1 will be described. In the embodiment, foam bodies 2A, 2B, 2F, 2H, and 2J to 2M for the first type in-mold foam molded article 1 may be also generically called foam bodies 2, insert members 3A, 3C to 3E, and 3M may be also generically called insert members 3, divided foam parts 4A, 4B, 4F, 4H, and 4J to 4M may be also generically called divided foam parts 4, and dividing spaces 5A, 5B, 5F, 5H, and 5J to 5M may be also generically called dividing spaces 5. In addition, the same elements in the in-mold foam molded articles 1A to 1D, 1F, 1H, and 1J to 1M are denoted by the same reference signs, and repeated descriptions thereof will be omitted. Note that the dividing space 5 corresponds to the movement facilitating structure, and the end faces of the divided foam parts 4 facing the dividing space 5 correspond to the dividing surfaces.

As illustrated in FIG. 2, the first type in-mold foam molded article 1 includes a foam body 2 including a polyolefin-based resin foam; and an insert member 3 including an elongated connecting portion 6 and movement resisting portions 7 provided apart from one another in the connecting portion 6, wherein the insert member 3 is embedded in and integrated with the foam body 2 formed by in-mold foam molding using pre-expanded beads, and the foam body 2 is divided into a plurality of divided foam parts 4 by a dividing space 5 provided along a direction crossing the connecting portion 6. The insert member 3 may have a portion completely exposed to the outside between the opposed dividing surfaces 5. Alternatively, however, the portion of the insert member 3 between the opposed dividing surfaces 5 may be partially covered with the foam body 2 within the acceptable range of warping of the in-mold foam molded article 1.

After the in-mold foam molded article 1 is released from the mold, the width of the dividing space 5 in the in-mold foam molded article 1 increases as the foam body 2 shrinks so that the divided foam parts 4 each independently shrink along the connecting portion 6 toward the movement resisting portion 7 side as indicated by the arrow C. In addition, after the shrinking, the width of the dividing space 5 decreases as the divided foam parts 4 return to their original shape so that the divided foam parts 4 each independently return smoothly to their original shape. After the release from the mold, therefore, the shrinking action of the divided foam parts 4 and the action of returning to their original shape go smoothly, which makes it possible to suppress or prevent the occurrence of warping in the in-mold foam molded article 1. The following should be noted. After released from the mold, the foam body 2 of the in-mold foam molded article 1 actually does not completely return to the original shape although it temporarily shrinks overall and then returns to near the original shape. Therefore, the foam body 2 of the in-mold foam molded article 1 reaches a slightly shrunk state overall, and the dividing space 5 reaches a slightly expanded state, as indicated by the virtual lines in FIGS. 2 to 6, from the position based on the dimensions of the mold indicated by the solid lines in FIGS. 2 to 6.

The insert member 3 used may have any structure as long as it includes an elongated connecting portion 6 and movement resisting portions 7 that are provided apart from one another in the connecting portion 6 and are more resistant to relative movement of the foam body 2 in the direction of shrinkage of the foam body 2 than the connecting portion 6 is.

For example, as illustrated in FIG. 3, a rectangular frame-shaped insert member 3A may be used, which has a pair of transverse portions 3Aa and a pair of longitudinal portions 3Ab. In this case, as illustrated in FIG. 3A, an in-mold foam molded article 1A may be provided with a dividing space 5A provided along a direction crossing the pair of longitudinal portions 3Ab; and a foam body 2A including two divided foam parts 4A separated by the dividing space 5A, or as illustrated in FIG. 3B, an in-mold foam molded article 1B may be provided with a dividing space 5A provided along a direction crossing the pair of longitudinal portions 3Ab; a dividing space 5B provided along a direction crossing the pair of transverse portions 3Aa; and a foam body 2B including four divided foam parts 4A separated by the dividing spaces 5A and 5B. The frame-shaped portion including a pair of transverse portions 3Aa and a pair of longitudinal portions 3Ab corresponds to the loop-shaped portion.

In the in-mold foam molded article 1A illustrated in FIG. 3A, the pair of longitudinal portions 3Ab function as connecting portions 6 and the pair of transverse portions 3Aa function as a pair of movement resisting portions 7, which are effective against possible warping along the longitudinal direction. After the in-mold foam molded article 1A is released from the mold, the width of the dividing space 5A in the in-mold foam molded article 1 increases as the foam body 2A shrinks so that the two divided foam parts 4A each independently shrink smoothly, as indicated by the arrow C, along the longitudinal portion 3Ab (as a connecting portion 6) toward the transverse portion 3Aa (as a movement resisting portion 7) side. In addition, after the shrinking, the width of the dividing space 5A decreases as the divided foam parts 4A return to their original shape so that the two divided foam parts 4A each independently return smoothly to their original shape. After the release from the mold, therefore, the shrinking action of the divided foam parts 4A and the action of returning to their original shape go smoothly, which makes it possible to suppress or prevent the occurrence of warping along the longitudinal direction in the in-mold foam molded article 1.

The structure of the in-mold foam molded article 1B illustrated in FIG. 3B is effective against possible warping along the longitudinal and transverse directions. For the divided foam parts 4B located on both sides of the dividing space 5A, the pair of longitudinal portions 3Ab function as connecting portions 6 and the pair of transverse portions 3Aa function as a pair of movement resisting portions 7 similarly to those mentioned above, so that as the width of the dividing space 5A increases, the divided foam parts 4B located on both sides of the dividing space 5A each independently shrink smoothly, as indicated by the arrow C, along the longitudinal portion 3Ab (as a connecting portion 6) toward the transverse portion 3Aa (as a movement resisting portion 7) side. In addition, for the divided foam parts 4B located on both sides of the dividing space 5B, the pair of transverse portions 3Aa function as connecting portions 6 and the pair of longitudinal portions 3Ab function as a pair of movement resisting portions 7, so that as the width of the dividing space 5B increases, the divided foam parts 4B located on both sides of the dividing space 5B each independently shrink smoothly, as indicated by the arrow D, along the transverse portion 3Aa (as a connecting portion 6) toward the longitudinal portion 3Ab (as a movement resisting portion 7) side, which makes it possible to suppress or prevent the occurrence of warping along the longitudinal and transverse directions in the in-mold foam molded article 1B.

The insert member 3 may be composed of a plurality of metal wires, such as three or more metal wires, joined by welding. For example, as illustrated in FIG. 3C, an in-mold foam molded article 1C may be provided with an insert member 3C including: one metal wire 10a as a connecting portion 6 extending in the longitudinal direction of the foam body 2A; and two metal wires 10b as movement resisting portions 7 extending in the transverse direction of the foam body 2A, in which the metal wires 10a and 10b are joined in an IT-shape. As illustrated in FIG. 3D, an in-mold foam molded article 1D may also be provided with an insert member 3D including U-shaped metal wires 11 each having: a longitudinal portion 11a as a connecting portion 6 extending in the longitudinal direction of the foam body 2A; and bent portions 11b as movement resisting portions 7 that are formed at both ends of the longitudinal portion 11a to protrude laterally.

Examples of the insert member 3 that can be used also include slender pipe-shaped, rod-shaped, plate-shaped, square or rectangular plate-shaped, or any other shaped members made of a metal material such as iron or stainless steel or a synthetic resin material. The above insert members may also be used in any combination to form the insert member 3. The movement resisting portions 7 may be of any type that is more resistant to movement of the foam body 2 in the longitudinal direction of the connecting portion 6 than the connecting portion 6 is. Examples of members that can function as the movement resisting portions 7 include bent portions, curved portions, enlarged diameter portions, roughened surface portions, protrusions, welded portions, additional members, such as hooks, wires, or plates, protruding laterally from the connecting portion 6, or other members protruding laterally or backwardly from the additional portions. In addition, the movement resisting portions 7 provided apart from one another in the connecting portion 6 may have the same or different structures.

The adjacent divided foam parts 4 in the foam body 2 may be completely separated from one another. Alternatively, however, at least parts of the adjacent divided foam parts 4 may be joined integrally within the acceptable warping range. For example, as illustrated in FIG. 4, an in-mold foam molded article 1F having a foam body 2F may be provided, in which the foam body 2F includes adjacent divided foam parts 4F and a pair of foam body joints 14 that are formed integrally to join both transverse ends of the adjacent divided foam parts 4F, and a dividing space 5F is formed so as to be surrounded by the adjacent divided foam parts 4F and the foam body joints 14. In order to reduce warping, however, the cross-sectional area of the foam body joints 14 may be as small as possible in the direction perpendicular to the direction where warping can occur.

The dividing space 5 may be formed in a shape other than the linear shape shown above. For example, as illustrated in FIG. 5A, an in-mold foam molded article 1H having a foam body 2H may be provided, in which a cranked dividing space 5H is formed at a portion in the longitudinal portion of the foam body 2H, and the foam body 2H is divided into two divided foam parts 4H by the dividing space 5H. Alternatively, as illustrated in FIG. 5B, an in-mold foam molded article 1J having a foam body 2J may be provided, in which a laterally Ω-shaped dividing space 5J is formed at a portion in the longitudinal portion of the foam body 2J, and the foam body 2J is divided into two divided foam parts 4J by the dividing space 5J. Alternatively, as illustrated in FIG. 5C, an in-mold foam molded article 1K having a foam body 2K may be provided, in which a laterally V-shaped dividing space 5K is formed at a portion in the longitudinal portion of the foam body 2K, and the foam body 2K is divided into two divided foam parts 4K by the dividing space 5K. Alternatively, as illustrated in FIG. 5D, an in-mold foam molded article 1L having a foam body 2L may be provided, in which a laterally corrugated dividing space 5L is formed at a portion in the longitudinal portion of the foam body 2L, and the foam body 2L is divided into two divided foam parts 4L by the dividing space 5L. In the in-mold foam molded articles and 1J to 1L illustrated in FIGS. 5A to 5D, the dividing spaces 5H and 5J to 5L are formed to cross the longitudinal portions 3Ab as connecting portions 6 so that they can facilitate relative movement between the transverse portion 3Aa as the movement resisting portion 7 and the foam bodies 2H and 2J to 2L.

The dividing space 5 may be formed at the longitudinal center of the in-mold foam molded article 1 so that both divided foam parts 4 can shrink in a well-balanced manner. However, the dividing space 5 may be located at any position that will not cause the in-mold foam molded article 1 to warp. The width of the dividing space 5 (the spacing between the divided foam parts 4) may also be selected freely. Basically, the divided foam parts 4 should be allowed to shrink in the direction indicated by the arrow C in FIG. 2. Alternatively, therefore, a slit-shaped dividing space passing thorough in the thickness direction may also be formed.

How many pieces and where the foam body 2 should be divided into by the dividing space 5 may be freely selected depending on, for example, the features of the in-mold foam molded article 1. The foam body 2 may also be divided into a plurality of pieces such as three or live or more pieces. For example, as in the in-mold foam molded article 1M illustrated in FIG. 6, four dividing spaces 5M may be formed to divide the foam body into five divided foam parts 4M.

The in-mold foam molded article 1 may also be formed in any shape other than the rectangular flat plate shape. The in-mold foam molded article 1 may be formed in a slender prismatic shape, such as a bumper core material for cars. For example, as illustrated in FIG. 6, an in-mold foam molded article 1M having a slender prismatic foam body 2M may be provided, in which the foam body 2M is molded integrally with a slender frame-shaped insert member 3M including a pair of transverse portions 3Ma, a pair of longitudinal portions 3Mb, and three reinforcing rods 15 provided in a ladder fashion between the pair of longitudinal portions 3Mb. In this case, the pair of transverse portions 3Ma and the three reinforcing rods 15 function as movement resisting portions 7. Therefore, a dividing space 5M is formed between the transverse portion 3Ma and the reinforcing rod 15 adjacent thereto and between the adjacent reinforcing rods 15, and the foam body 2M includes a plurality of divided foam parts 4M arranged in series. In this regard, the frame-shaped portion including the pair of transverse portions 3Ma and the pair of longitudinal portions 3Mb corresponds to the loop-shaped portion.

(Second Type In-Mold Foam Molded Article)

Next, the second type in-mold foam molded article 21 will be described. In the embodiment, foam bodies 22A to 22D for the second type in-mold foam molded article 21 are also generically called foam bodies 22, and movement allowing spaces 25A to 25D are also generically called movement allowing spaces 25. In addition, the same elements in the in-mold foam molded articles 21A to 21D are denoted by the same reference signs, and repeated descriptions thereof will be omitted.

As illustrated in FIG. 7, the second type in-mold foam molded article 21 includes a foam body 22 including a polyolefin-based resin foam; an insert member 23 including an elongated connecting portion 26 and movement resisting portions 27 provided apart from one another in the connecting portion 26, wherein the insert member 23 is embedded in and integrated with the foam body 22 formed by in-mold foam molding using pre-expanded beads; and movement allowing spaces 25 each including a grove and/or a through hole that exposes the movement resisting portion 27 to the outside and allows relative movement between the movement resisting portion 27 and the foam body 22 by providing a space between the movement resisting portion 27 and the foam body 22 along a direction where warping can occur. The portion of the insert member 23 in the movement allowing space 27 may be completely exposed to the outside. However, the portion of the insert member 23 in the movement allowing space 27 may be at least partially covered with the foam body 22 within the acceptable range of warping of the in-mold foam molded article 21.

After the in-mold foam molded article 21 is released from the mold, as the foam body shrinks, each movement resisting portion 27 moves in each movement allowing space 25, so that the foam body 22 smoothly shrinks in the direction of the arrow A along the connecting portion 26. In addition, after the shrinking, each movement resisting portion 27 also moves in each movement allowing space 25 as the foam body 22 returns to its original shape so that the foam body 22 smoothly returns to its original shape along the connecting portion 26. After the release from the mold, therefore, the shrinking action of the foam body 22 and the action of returning to the original shape go smoothly, which makes it possible to suppress or prevent the occurrence of warping in the in-mold foam molded article 21. The following should be noted. After released from the mold, the foam body 22 of the in-mold foam molded article 21 actually does not completely return to the original shape although it temporarily shrinks overall and then returns to near the original shape. Therefore, the foam body 22 of the in-mold foam molded article 21 reaches a slightly shrunk state overall, and the movement allowing spaces 25 are shifted toward the center of the foam body 22, as indicated by the virtual lines in FIGS. 7 and 8A to 8D, from the position based on the dimensions of the mold indicated by the solid lines in FIGS. 7 and 8A to 8D.

Figure 8A:
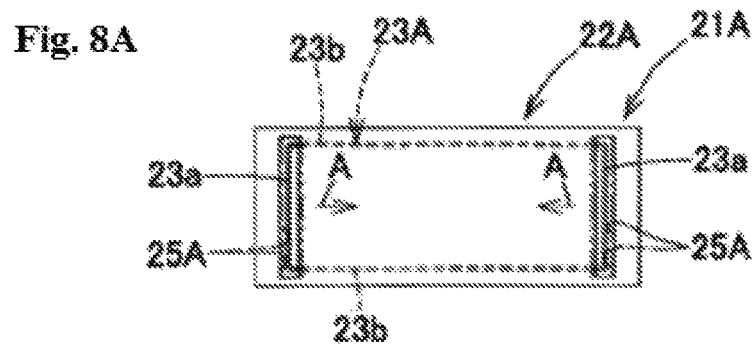
FIGS. 8A, 8B, 8C, and 8D are plan views of other second type in-mold foam molded articles with different structures.

As illustrated in FIG. 8A, an in-mold foam molded article 21A may be provided with, as the insert member 23, a rectangular frame-shaped insert member 23A including a pair of transverse portions 23a and a pair of longitudinal portions 23b. In the insert member 23A, the pair of transverse portions 23a, which function as movement resisting portions 27, are entirely exposed to the outside, and both ends of the pair of longitudinal portions 23b, which function as connecting portions 26, are exposed to the outside. The in-mold foam molded article 21A also has a pair of movement allowing spaces 25A that are each formed along the transverse portion 23a and each include a groove and/or a through hole to provide a space between the insert member 23A and the foam body 22A along the direction of the arrow A where warping can occur. After the in-mold foam molded article 21A is released from the mold, the movement allowing spaces 25A in the in-mold foam molded article 21A allow the foam body 22A to move in the directions of the arrow A relative to the transverse portions 23a of the insert member 23, which makes it possible to prevent the occurrence of warping when the foam body 22A returns to its original shape. The frame-shaped portion including the pair of transverse portions 23a and the pair of longitudinal portions 23b corresponds to the loop-shaped portion.

Figure 8B:
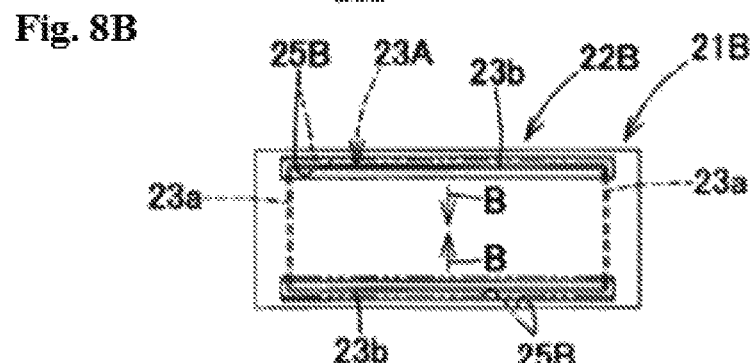

As illustrated in FIG. 8B, an in-mold foam molded article 21B may also be provided with, as the insert member 23, a rectangular frame-shaped insert member 23A including a pair of longitudinal portions 23b and a pair of transverse portions 23a. In the insert member 23A, the pair of longitudinal portions 23b, which function as movement resisting portions 27, are entirely exposed to the outside, and both ends of the pair of transverse portions 23a, which function as connecting portions 26, are exposed to the outside. The in-mold foam molded article 21B also has movement allowing spaces 25B that are each formed along the longitudinal portion 23b and each include a groove and/or a through hole to provide a space between the insert member 23B and the foam body 22B along the direction of the arrow B where warping can occur. After the in-mold foam molded article 21B is released from the mold, the movement allowing spaces 25B in the in-mold foam molded article 21B allow the foam body 22B to move in the directions of the arrow B relative to the longitudinal portions 23b of the insert member 23, which makes it possible to prevent the occurrence of warping when the foam body 22B returns to its original shape.

Figure 8C:
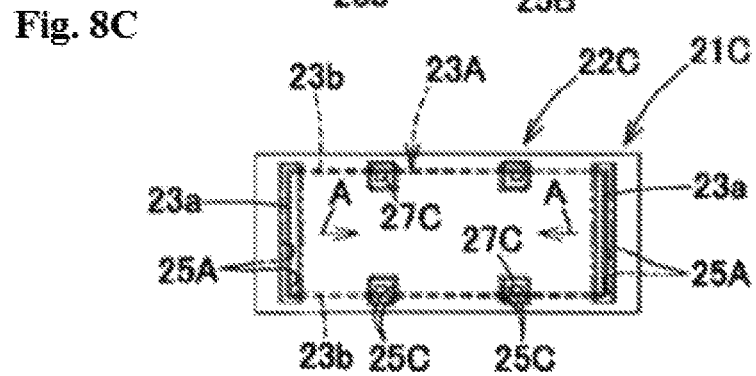
Figure 8D:
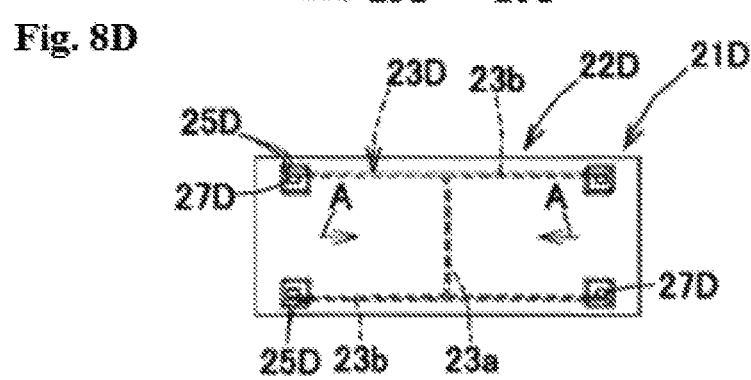

In the in-mold foam molded articles 21A and 21B, the second movement allowing spaces 25A and 25B are so formed that in the frame-shaped insert member 23, the portion extending as the movement resisting portion 27 in the direction crossing the direction where warping can occur, namely, the transverse portion 23a or the longitudinal portion 23b of the insert member 23 is exposed to the outside. Alternatively, when the insert member 23 has an additional movement resisting portion 27, which is more resistant than the connecting portion 26 is, to relative movement of the foam body 22 in the direction where warping can occur, in addition to the transverse portion 23a or the longitudinal portion 23b, the second movement allowing space 25 may be formed in the foam body 22 so as to expose the additional movement resisting portion 27 to the outside. As illustrated in FIG. 8C, an in-mold foam molded article 21C may be provided with an insert member 23 including movement resisting portions 27C that are each provided in the longitudinal portion 23b of the insert member 23 and each include a bent portion, a curved portion, an enlarged diameter portion, a roughened surface portion, a protrusion, a welded portion, or an additional member, such as a hook, a wire, or a plate, protruding laterally from the connecting portion 6. In this case, the in-mold foam molded article 21C may also have movement allowing spaces 25C formed in the foam body 22C and each including a grove and/or a through hole that exposes the movement resisting portion 27C to the outside and provides a space between the movement resisting portion 27C and the foam body 22C along the direction of the arrow A where warping can occur. Alternatively, as illustrated in FIG. 8D, an in-mold foam molded article 21D may be provided with, as an alternative to the insert member 23 shown above, an insert member 23D including: longitudinal portions 23b; a single transverse portion 23a connecting the longitudinal portions 23b at a substantially central position along the longitudinal direction; and movement resisting portions 27D that are provided at both ends of each longitudinal portion 23b and each include, for example, a bent portion, a protrusion, a hook, or a welded portion. In this case, the in-mold foam molded article 21D may have movement allowing spaces 25D formed in the foam body 22D and each including a grove and/or a through hole that exposes the movement resisting portion 27D to the outside and provides a space between the movement resisting portion 27D and the foam body 22D along the direction of the arrow A where warping can occur.

Each movement allowing space 25 has such a size that the movement resisting portion 27 placed in the space 25 will not come into contact with the inner wall of the space 25 when the foam body 22 shrinks temporarily after released from the mold. In addition, as indicated by the virtual lines in FIGS. 7 and 8A to 8D, the movement allowing, spaces 25 are slightly shifted toward the center from the position indicated by the solid lines in FIGS. 7 and 8A to 8D. Therefore, taking into account the fact that as the foam body 22 shrinks, the movement allowing spaces 25 move as indicated by the virtual lines in FIG. 8A to 8D, the movement resisting portion 27 in each movement allowing space 25 may be located at a position closer to the center of the foam body 22 than the position indicated by the solid line in FIG. 8A to 8D so that the opening area of each movement allowing space 25 can be reduced. There is difficulty in setting the size of the movement allowing spaces 25 to constant values because the size of the movement allowing spaces 25 varies with the size, material, and expansion ratio of the foam body 22, the shrinkage rate of the foam body 22 before and after cooling after the release from the mold, the size, material, and thermal expansion coefficient of the insert member 23, the conditions for forming the in-mold foam molded article 21, and other factors. The movement allowing spaces 25 may have any size as long as each movement resisting portion 27 can be placed in each movement allowing space 25 after the in-mold foam molded article 21 is formed and cooled. The upper limit of the size of the movement allowing spaces 25 may be set as small as possible, taking into account, for example, the strength and appearance of the in-mold foam molded article 21.

The movement allowing space 25 may be entirely formed of a through hole or a groove. Alternatively, a part of the movement allowing space 25 may be formed of a through hole while the remaining part may be formed of a groove. Some of the movement allowing spaces 25 may each be formed of a through hole while the others may each be formed of a groove, or they may be used in any combination to form the movement allowing spaces 25. When a groove is used to form the movement allowing space 25, the groove may be formed on the front surface side or back surface side of the foam body 22, and some of the grooves for the movement allowing spaces 25 may be formed on the front surface side while the others may be formed on the back surface side. In addition, only one of the movement resisting portions 27 provided apart from one another in the connecting portion 26 may be placed in the movement allowing space 25, whereas the other movement resisting portion or portions 27 may be embedded in the foam body 22. In other words, any movement resisting portion 27 that will not move relative to the foam body 22 upon shrinking of the foam body 22 may be embedded in the foam body 22. For example, in the in-mold foam molded article 21D of FIG. 8D, warping can be prevented although the transverse portion 23a as a movement resisting portion 27 is embedded in the foam body 22D. This is because the transverse portion 23a will not move relative to the foam body 22 when the foam body 22D shrinks toward the transverse portion 23a although the transverse portion 23a is more resistant to movement of the shrinking foam body 22 than the longitudinal portion 23b as a connecting portion 26 is.

Examples of the insert member 3 include metal wires and other members such as slender pipe-shaped or rod-shaped members made of a metal material such as iron or stainless steel or a synthetic resin material. The insert member 23 used has a rectangular frame shape like the insert member 3A shown above. Alternatively, the insert member 23 may have a non-rectangular frame shape, or may be configured similarly to the insert member 3 shown above. Like the movement resisting portions 7 shown above, the movement resisting portions 27 may also have any structure that is more resistant to movement of the foam body 22 in the longitudinal direction of the connecting portion 26 than the connecting portion 26 is. Examples of members that can function as the movement resisting portions 27 include bent portions, curved portions, enlarged diameter portions, roughened surface portions, protrusions, welded portions, and additional members, such as hooks, wires, or plates, protruding laterally from the connecting portion 26. In addition, the movement resisting portions 27 provided apart from one another in the connecting portion 26 may have the same or different structures.

In addition, the in-mold foam molded article 21 may also have any shape other than the rectangular flat plate shape. Moreover, an in-mold foam molded article having any combination of the dividing space 5 for the first type in-mold foam molded article 1 and the movement allowing spaces 25 for the second type in-mold foam molded article 21 may also be provided, such as the in-mold foam molded article 21AB illustrated in FIG. 22, which has a combination of a dividing space 5AA and movement allowing spaces 25AA.

(Polyolefin-Based Resin)

The polyolefin-based resin used to form the foam bodies 2 and 22 is a polymer including 75% by weight or more of an olefin-based monomer.

Examples of the olefin-based monomer include α-olefins of 2 to 12 carbon atoms, such as ethylene, propylene, butene-1, isobutene, pentene-1, 3-methyl-butene-1, hexene-1, 4-methyl-pentene-1, 3,4-dimethyl-butene-1, heptene-1, 3-methyl-hexene-1, octene-1, and decene-1. These olefins may be used alone or in combination of two or more.

Examples of other monomers polymerizable with the olefin-based monomer include cyclic olefins such as cyclopentene, norbornene, and 1,4,5,8-dimethano-1,2,3,4,4a,8,8a,6-octahydronaphthalene, and dienes such as 5-methylene-2-norbornene, 5-ethylidene-2-norbornene, 1,4-hexadiene, methyl-1,4-hexadiene, and 7-methyl-1,6-octadiene. These monomers may be used alone or in combination of two or more.

Examples of the polyolefin-based resin include polyethylene-based resin composed mainly of ethylene, such as high-density polyethylene, medium-density polyethylene, low-density polyethylene, linear low-density polyethylene, and other polyethylene-based resins, and propylene-based resins composed mainly of propylene. These polyolefin-based resins may be used alone or in combination of two or more.

The polypropylene-based resins may be of any type including a main component derived from a propylene-based monomer, such as propylene homopolymers, olefin-propylene random copolymers, or olefin-propylene block copolymers. These resins may be used alone or in combination of two or more.

Examples of the polyethylene-based resin used in one or more embodiments of the present invention include ethylene homopolymers, ethylene-α-olefin random copolymers, ethylene-α-olefin block copolymers, low-density polyethylene, high-density polyethylene, and linear low-density polyethylene. In this regard, examples of the α-olefin include α-olefins of 3 to 15 carbon atoms. These may be used alone or in combination of two or more.

Among these polyethylene-based resins, an ethylene-α-olefin block copolymer with a non-ethylene comonomer content of 1 to 10% by weight or linear low-density polyethylene has good foamability and may be subjected to in-mold foam molding.

If necessary, the polyolefin-based resin used in one or more embodiments of the present invention may be mixed with additives such as a cell nucleating agent such as talc; a stabilizer such as an antioxidant, a metal deactivator, a phosphorus-based process stabilizer, an ultraviolet absorber, an ultraviolet stabilizer, a fluorescent brightening agent, or a metallic soap; a crosslinking agent, a chain transfer agent, a lubricant, a plasticizer, a filling gun, a reinforcement, an inorganic pigment, an organic pigment, a conductive modifier, a flame-retardant modifier, and a surfactant or polymer antistatic agent, and the resulting polyolefin-based resin composition may be used.

The polyolefin-based resin composition used in one or more embodiments of the present invention should be processed so as to be easily subjected to pre-expanding. In general, therefore, using an extruder, a kneader, a Banbury mixer, a roll, or other machines, the polyolefin-based resin and optionally the additives are preliminarily incited and mixed, and then formed into polyolefin-based resin particles with a desired shape, such as a cylindrical, oval, spherical, cubic, or rectangular solid shape.

The method for producing polyolefin-based resin pre-expanded beads for use in one or more embodiments of the present invention may be, but not limited to, what is called a decompression foaming method, which includes dispersing the polyolefin-based resin particles, a dispersing agent, and other materials into a dispersion medium in the presence of a foaming agent in a closed vessel, impregnating the resin particles with the foaming agent while heating the dispersion to a predetermined foaming temperature under increased pressure, and then foaming the dispersion by releasing it from the closed vessel to a low-pressure region while keeping constant the temperature and pressure in the vessel.

The heating temperature in the closed vessel may be in a range from the temperature 25° C. lower than the melting point of the polyolefin-based resin particles to the temperature 25° C. higher than the melting point of the polyolefin-based resin particles, such as in a range from the temperature 15° C. lower than the melting point of the polyolefin-based resin particles to the temperature 15° C. higher than the melting point of the polyolefin-based resin particles. The polyolefin-based resin pre-expanded beads can be produced by a process that includes pressurizing the dispersion by heating to impregnate the polyolefin-based resin particles with the foaming agent and then releasing the polyolefin-based resin particles into an atmosphere at a pressure lower than that in the closed vessel by opening one end of the closed vessel.

Examples of the foaming agent for use in the production of the polyolefin-based resin pre-expanded beads include, but are not limited to, aliphatic hydrocarbons such as propane, isobutane, normal butane, isopentane, and normal pentane; inorganic gases such as air, nitrogen, and carbon dioxide; water; and any mixture thereof.

(Seat Core Material Produced Using First Type In-Mold Foam Molded Article 1A)

Next, with reference to the drawings, a description will be given of an in-mold foam molded article 1AA and a mold apparatus M1 for use in the forming thereof in a case where the first type in-mold foam molded article 1A is used to form a seat core material for car back seats. Note that the front, back, left, right, top, and bottom are defined with reference to FIG. 9 for the description of the embodiment.

Figure 9:
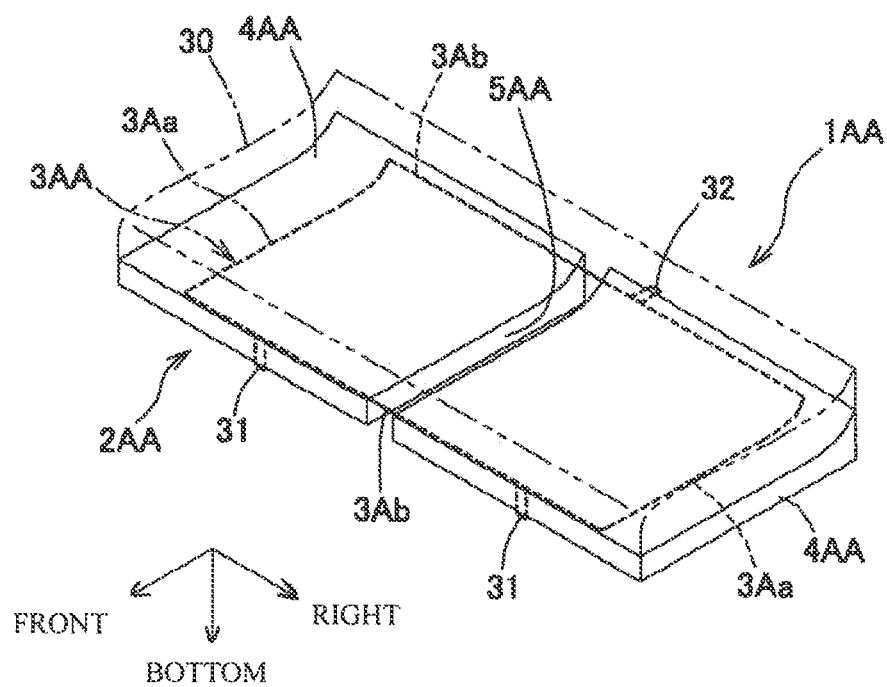
FIG. 9 is a perspective view of the first type in-mold foam molded article.

The in-mold foam molded article 1AA illustrated in FIGS. 9 and 10 is a seat cushion core material that will be installed in a car back seat. The in-mold foam molded article 1AA includes a foam body 2AA including a polyolefin-based resin foam; and a frame-shaped insert member 3AA that is embedded in and integrated with the foam body 2AA upon in-mold foam molding of the foam body 2AA using pre-expanded beads, wherein the foam body 2AA is divided into two divided foam parts 4AA at a portion in its longitudinal portion, and a dividing space 5AA is formed including a space between the adjacent divided foam parts 4AA. A car seat cushion is formed by integrally forming a molded polyurethane article 30 on the upper side of the in-mold foam molded article 1AA as indicated by the virtual lines in FIG. 9.

The foam body 2AA is formed similarly to the foam body 2A in FIG. 3A, except that its back portion is inclined obliquely upward. In this regard, the shape and size of the foam body 2AA can be selected as appropriate depending on the car body structure or other conditions.

The insert member 3AA is formed by bending a metal wire, such as an iron or stainless steel wire, into the shape of a rectangular frame and then welding its both ends. The insert member 3AA includes a pair of transverse portions 3Aa, which are arranged along the transverse direction to function as movement resisting portions 7, and a pair of longitudinal portions 3Ab, which are arranged along the longitudinal direction to function as connecting portions 6. A portion in each of the longitudinal portions 3Ab is exposed to the outside in the dividing space 5AA. The insert member 3AA is formed similarly to the insert member 3A in FIG. 3A, except that back portions of the left and right transverse portions 3Aa are inclined obliquely upward along the back portion of the foam body 2AA.

A pair of tell and right U-shaped fasteners 31 are fixed by welding at individual portions in the front-side longitudinal portion 3Ab of the insert member 3AA. The fasteners 31 are disposed in such a manner that their base ends are embedded in the divided foam parts 4AA while their tip portions protrude downward from the divided foam parts 4AA. A substantially U-shaped fastener 32 is fixed by welding to the back-side longitudinal portion 3Ab of the insert member 3AA. The fastener 32 is disposed so as to protrude backward from the right end vicinity of the right-side divided foam part 4AA. The in-mold foam molded article 1AA is so designed that it can be attached to a car body by engaging and fixing the fasteners 31 and 32 to hooks on the car body. In this regard, the number, shape, and location of the fasteners 31 and 32 may be freely selected depending on, for example, the number, shape, and location of the hooks on the car body. In this regard, the fasteners 31 and 32 can also function as movement resisting portions 27. In one or more embodiments, therefore, similarly to the second type in-mold foam molded article 21, movement allowing spaces 25 each for accommodating the whole of each of the fasteners 31 and 32 may also be formed in the foam body 2AA in such a manner that the fasteners 31 and 32 are entirely exposed to the outside.

After the in-mold foam molded article 1AA is released from the mold, the width of the dividing space 5AA in the in-mold foam molded article 1AA increases as the foam body 2AA shrinks so that the two divided foam parts 4AA each independently shrink smoothly along the longitudinal portion 3Ab as the connecting portion 6 toward the transverse portion 3Aa (as the movement resisting portion 7) side as indicated by the arrow C. In addition, after the shrinking, the width of the dividing space 5AA decreases as the divided foam parts 4AA return to their original shape so that the two divided foam parts 4AA each independently return smoothly to their original shape. After the release from the mold, therefore, the shrinking action of the divided foam parts 4AA and the action of returning to their original shape go smoothly, which makes it possible to suppress or prevent the occurrence of warping along the longitudinal direction in the in-mold foam molded article 1AA.

(Mold Apparatus)

Next, the features of the mold apparatus M1 will be described.

As illustrated in FIGS. 11 to 14, the mold apparatus M1 for use in in-mold foam molding includes a female mold unit 40 including a female mold part 41 and a female mold housing 42 adapted to hold the female mold part 41; a male mold unit 50 including a male mold part 51 and a male mold housing 52 adapted to hold the male mold part 51; partition means 60 configured to partition the molding space between the female and male mold parts 41 and 51 into a pair of left and right molding spaces CA; and a plurality of permanent magnets 76 provided to hold an insert member 3AA in the molding spaces CA. The mold apparatus M1 is configured so that: the insert member 3AA is fixedly held in the male mold unit 50 by the permanent magnets 76; the female and male mold units 40 and 50 are mated; foamable resin particles are charged into both molding spaces CA; and the foamable resin particles are heated, expanded, and fused in the molding spaces CA to form an in-mold foam molded article 1AA that includes a foam body 2AA including a pair of divided foam parts 4AA, and the insert member 3AA embedded in and integrated with the divided foam parts 4AA.

In order to heat and cool the in-mold foam molded article 1AA smoothly, the mold including the female and male mold parts 41 and 51 is made of a material with low specific heat and high thermal conductivity, such as an aluminum alloy casting. Both housings 42 and 52 are made of an iron-based metal material in order to reduce the cost of manufacturing the mold apparatus M1 and ensure sufficient strength and stiffness.

The female mold housing 42 includes a square tube-shaped female mold frame 43; a center plate 44; a female mold part 41 that is so fixed to the female mold frame 43 with the center plate 44 placed therebetween as to close the front-side opening of the female mold frame 43 (the opening on the mating face side of the mold); and a female mold back plate 45 provided to close the back-side opening of the female mold frame 43. In the female mold housing 42, a female mold chamber 46 is formed on the back side of the female mold part 41.

A steam supply pipe 48a, a cooling water supply pipe 48b, and a drain pipe 48c, each having an opening located in the female mold chamber 46, are connected to the female mold unit 40. Control valves 49a, 49b, and 49c are respectively attached at portions in the pipes 48a, 48b, and 48c so that they can be operated to supply steam into the female mold chamber 46 for the heating and expanding of the foamable resin particles, to allow cooling water to be sprayed from back-side nozzles 48*d* of the female mold part 41 for the cooling of the in-mold foam molded article 1AA, and to discharge unnecessary drain from the female mold chamber 46. A large number of vents 41*a* are formed in the female mold part 41 so that steam can be supplied from the female mold chamber 46 into the molding space CA through the vents 41*a*. A pair of filling guns 47 are fixed to the female mold back plate 45. The tip portions of the filling guns 47 are inserted into the female mold part 41 and have openings located in the left and right molding spaces CA, respectively, so that the foamable resin particles can be supplied from the filling guns 47 into the molding spaces CA and charged into the molding spaces CA. Although not shown, an ejector pin is also inserted in and supported by the female mold back plate 45 so as to be inserted into the female mold part 41, and to be ejected into the molding spaces CA.

The male mold housing 52 includes a square tube-shaped male mold frame 53; a center plate 54; a male mold part 51 that is so fixed to the male mold frame 53 with the center plate 54 placed therebetween as to close the front-side opening of the male mold frame 53 (the opening on the mating face side of the mold); and a male mold back plate 55 provided to close the back-side opening of the male mold frame 53. In the male mold housing 52, a male mold chamber 56 is formed on the back side of the male mold part 51.

A steam supply pipe 58*a*, a cooling water supply pipe 58*b*, and a drain pipe 58*c*, each having an opening located in the male mold chamber 56, are connected to the male mold unit 50. Control valves 59*a*, 59*b*, and 59*c* are respectively attached at portions in the pipes 58*a*, 58*b*, and 58*c* so that they can be operated to supply steam into the male mold chamber 56 for the heating and expanding of the foamable resin particles, to allow cooling water to be sprayed from back-side nozzles 58*d* of the male mold part 51 for the cooling of the in-mold foam molded article 1AA, and to discharge unnecessary drain from the male mold chamber 56. A large number of vents 51*a* are formed in the male mold part 51 so that steam can be supplied from the male mold chamber 56 into the molding space CA through the vents 51*a*.

Now, the partition means 60 will be described. As illustrated in FIGS. 11 to 14, a fitting protrusion 61 that protrudes toward the female mold part 41 side at the longitudinal center (the center along the left-right direction) of the male mold part 51 is formed over the almost entire width of the male mold part 51, except for both transverse end portions (in the front-back direction) of the molding portion 51*b* of the male mold part 51. On the front side of the fitting protrusion 61, a first receiving portion 62 is provided to protrude toward the female mold part 41 side to a position corresponding to the height of the front-side longitudinal portion 3Ab of the insert member 3AA (the lower side in FIG. 11A) placed in the molding space CA. On the back side of the fitting protrusion 61 (the upper side in FIG. 11A), a second receiving portion 63 is provided to protrude toward the female mold part 41 side to a position corresponding to the height of the back-side longitudinal portion 3Ab of the insert member 3AA placed in the molding space CA. The first and second receiving portions 62 and 63 are formed continuously with the fitting protrusion 61.

A bottomed fitting recess 64 extending in the transverse direction of the female mold part 41 is formed at the longitudinal center of the female mold part 41. In a front end portion of the fitting recess 64 (an upper side end portion in FIG. 11B), a first block 65 is placed to face the first receiving portion 62. In a back end portion of the fitting recess 64 (a lower side end portion in FIG. 11B), a second block 66 is placed to face the second receiving portion 63. A first holding groove 65*a* for holding a longitudinal center portion of the front-side longitudinal portion 3Ab is formed at the tip face of the first block 65. A second holding groove 66*a* for holding a central portion of the back-side longitudinal portion 3Ab is formed at the tip face of the second block 66. Guide rods 67 and 68 are provided to guide the first and second blocks 65 and 66 movably in the mold opening/closing direction, respectively. Spring members 69 and 70 are also provided to constantly push the first and second blocks 65 and 66, respectively, toward the male mold part 51 side, and regulation portions 67*a* and 68*a* are provided in the guide rods 67 and 68 to regulate the protruding positions, respectively.

In the partition means 60, the first and second blocks 65 and 66 are disposed continuously with both longitudinal sides of the fitting protrusion 61 with no gap between them. When the female mold part 41 and the male mold part 51 with the insert member 3AA being attached thereto are closed together, the central portion of the front-side longitudinal portion 3Ab of the insert member 3AA is held in the first holding groove 65*a* of the first block 65, and the tip face of the first block 65 is pressed against the first receiving portion 62. At the same time, the central portion of the back-side longitudinal portion 3Ab of the insert member 3AA is held in the second holding groove 66*a* of the second block 66, and the tip face of the second block 66 is pressed against the second receiving portion 63. In addition, the tip portion of the fitting protrusion 61 is fit into the fitting recess 64 substantially with no gap between them, so that the space in the mold is partitioned into two molding spaces CA by the first and second blocks 65 and 66 and the fitting protrusion 61. Thus, the pair of molding spaces CA allow the formation of the pair of divided foam parts 4AA, and the first and second blocks 65 and 66 and the fitting protrusion 61 allow the formation of the dividing space 5AA.

In order to hold the fastener 32 between the female and male mold parts 41 and 51, a third receiving portion 71 is formed beside the second receiving portion 63 of the male mold part 51 to accommodate the portion of the fastener 32, which protrudes outside from the foam body 2AA. At the back-side portion of the female mold part 41, a guide groove 41*c*, into which the third receiving portion 71 is insertable, is formed along the mold opening/closing direction, and in the guide groove 41*c*, the third block 72 is held movably in the mold opening/closing direction. A guide rod 73 is provided to guide the third block 72 movably in the mold opening/closing direction. A spring member 74 is also provided to constantly push the third block 72 toward the male mold part 51 side, and a regulation portion 73*a* is provided in the guide rod 73 to regulate the protruding position. The tip face of the third block 72 is located at the same height as the tip lace of the second block 66. At the tip face of the third block 72, a third holding groove 72*a* is formed to accommodate the portion of the fastener 32, which protrudes outside from the foam body 2AA.

In order to hold the left and right fasteners 31 in the male mold part 51, bottomed recesses 75 are formed at the front-side portion of the male mold part 51 to accommodate the pair of fasteners 31 of the insert member 3AA. The bottomed recesses 75 each has an opening located in the molding space CA, in which the opening has an elliptical shape slender in the left-right direction.

The permanent magnets 76 for magnetically holding the insert member 3AA are provided on the tip faces of the first and second receiving portions 62 and 63 to hold a portion in each of the front- and back-side longitudinal portions 3Ab of the insert member 3AA. In addition, the permanent magnets 76 are provided on the tip face of the third receiving portion 71 to hold the fastener 32 and also provided on the bottoms of the recesses 75 to hold the tip portions of the fasteners 31. When the insert member 3AA is attached to the male mold part 51, the fasteners 31 can be loaded into the left and right recesses 75 and the insert member 3AA can be magnetically held by the permanent magnets 76, so that the insert member 3AA can be fixed and held at a proper position of the male mold part 51.

The above embodiment shows the mold apparatus M1 for forming the in-mold foam molded article 1AA. In the mold apparatus M1, the shape, number, and location of the fitting recess 64, the first receiving portion 62 and the first block 65, the second receiving portion 63 and the second block 66, the third receiving portion 71 and the third block 72, the fitting protrusion 61, or other components may be appropriately selected so that the in-mold foam molded articles 1A to 1D, 1F, 1H, and 1J to 1M shown above can also be formed.

(In-Mold Foam Molding Method)

Figure 13:
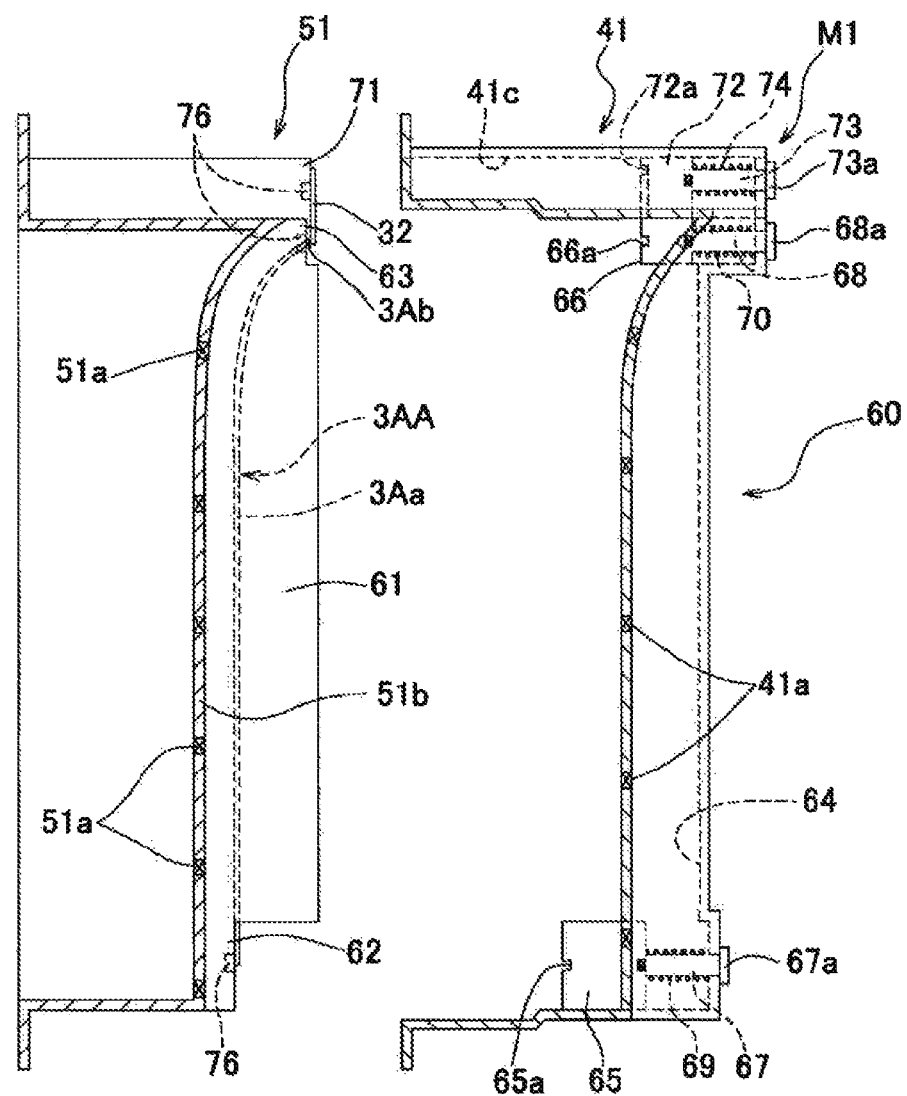
FIG. 13 is a cross-sectional view, along the XII-XII line in FIG. 11, of the opened state of the mold for forming the in-mold foam molded article of FIG. 9.

Using the mold apparatus M1, the in-mold foam molded article 1AA is formed as described below. First, while the female and male mold parts 41 and 51 are opened, as illustrated in FIG. 11A and FIG. 13, the fasteners 31 of the insert member 3AA are fit into the recesses 75 and the insert member 3AA is attached to the male mold part 51 by means of the permanent magnets 76.

Figure 12:
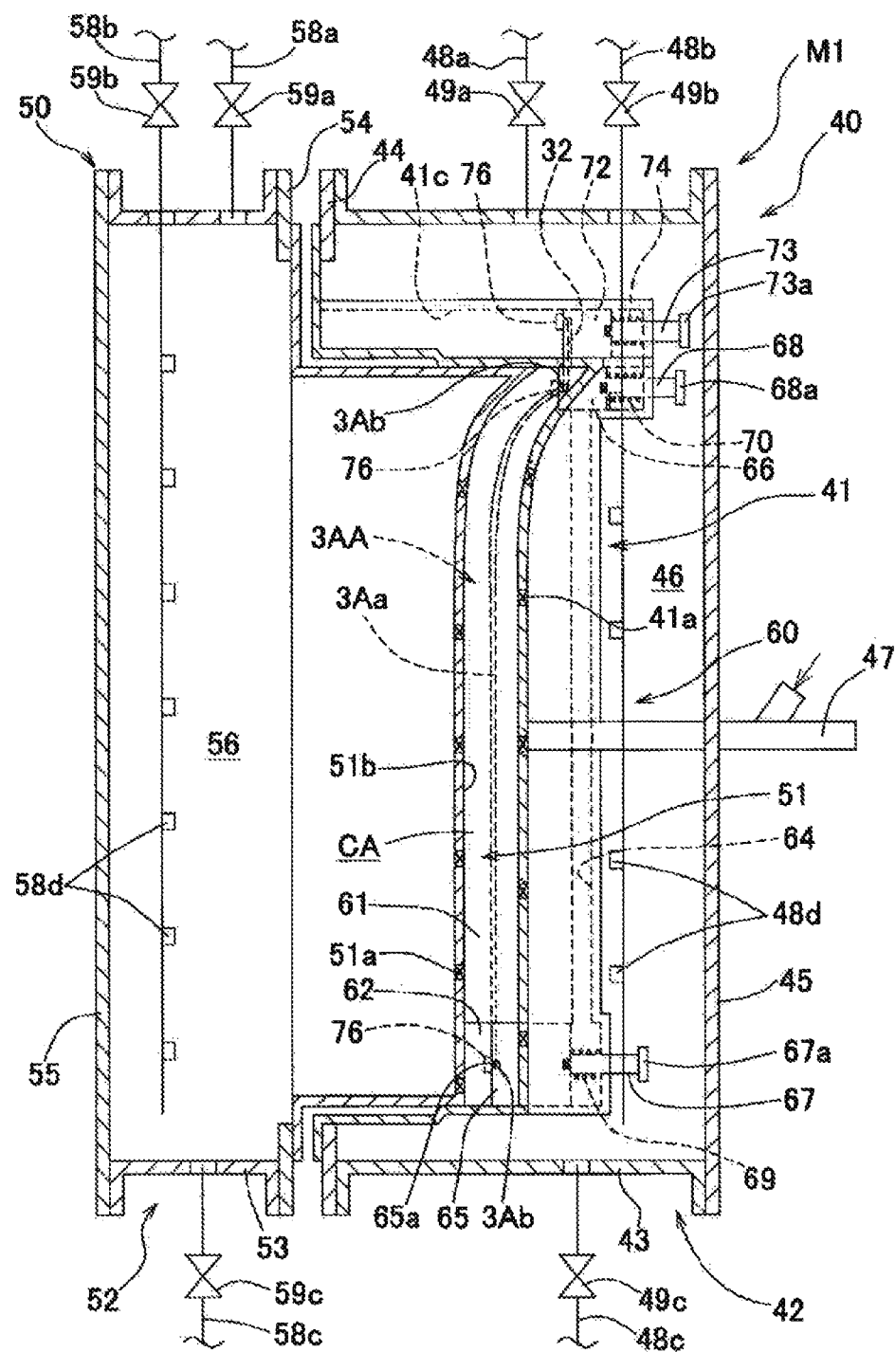
FIG. 12 is a cross-sectional view, along the XII-XII line in FIG. 11, of the closed state of a mold apparatus for forming the in-mold foam molded article of FIG. 9.
Figure 14A:
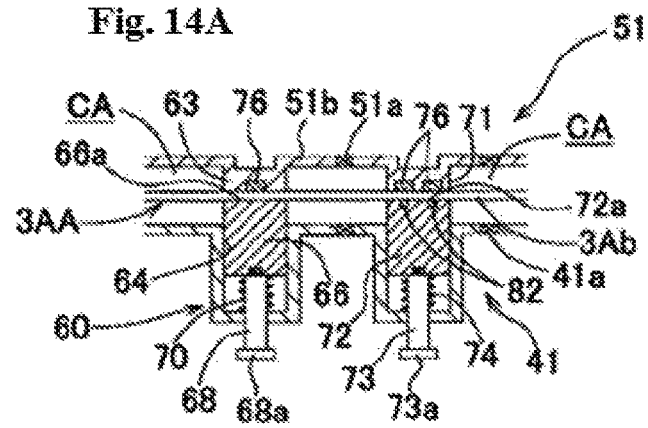
FIGS. 14A, 14B, and 14C are cross-sectional views, along the a-a, b-b, and c-c lines in FIG. 11, of the closed state of the mold for forming the in-mold foam molded article of FIG. 9.
Figure 14B:
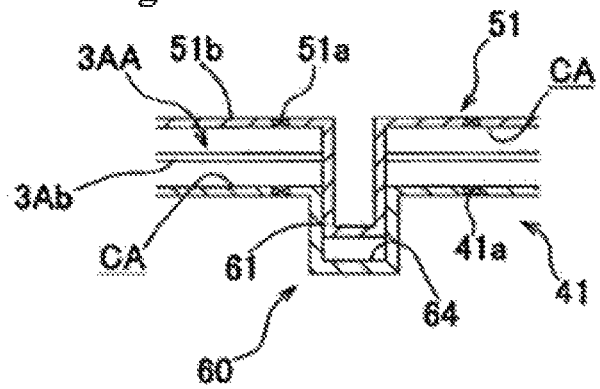
Figure 14C:
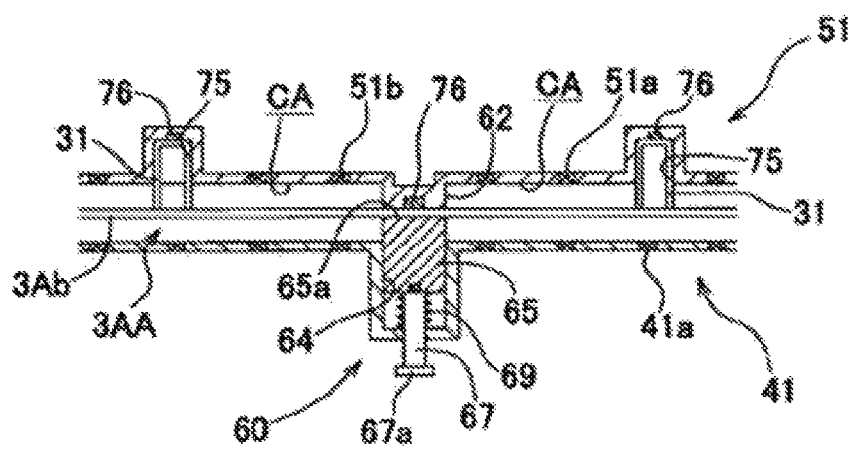

Subsequently, as illustrated in FIG. 12, the male and female mold parts 51 and 41 are closed with a small space left between them. At this time, as illustrated in FIG. 14C, the central portion of the front-side longitudinal portion 3Ab of the insert member 3AA is held in the first holding groove 65a of the first block 65 and the tip face of the first block 65 is brought into contact with the first receiving portion 62; as illustrated in FIG. 14A, the central portion of the back-side longitudinal portion 3Ab of the insert member 3AA is held in the second holding groove 66a of the second block 66 and the tip face of the second block 66 is brought into contact with the second receiving portion 63; and as illustrated in FIG. 14B, the tip portion of the fitting protrusion 61 is fit into the fitting recess 64 substantially with no gap between them, so that the molding space CA is partitioned into two molding spaces CA by the first and second blocks 65 and 66 and the fitting protrusion 61. At this time, the back-side fastener 32 of the insert member 3AA is held in the third holding groove 72a of the third block 72, the tip lace of the third block 72 is brought into contact with the third receiving portion 71, and the fastener 32 is held between the third receiving portion 71 and the third block 72. In this state, the pre-expanded beads are charged into the left and right molding spaces CA, and then, the mold parts are closed completely. However, an alternative molding method may also be used, including completely closing the male and female mold parts 51 and 41 to form the left and right molding spaces CA and then charging the pre-expanded beads into the left and right molding spaces CA. The pre-expanded beads used may have an increased internal pressure that is preliminarily given by pressurized injection of inorganic gas or the like, or the pre-expanded beads used may have the atmospheric pressure without being increased in internal pressure.

While the male and female mold parts 51 and 41 are completely closed in this way, steam at about 0.10 to about 0.40 MPa (G) is supplied to the female and male mold chambers 46 and 56, so that the pre-expanded beads are heated, expanded, and fused to form the foam body 2AA. In this process, the expansion ratio of the pre-expanded beads used and the shape of the foam body differ from article to article. Therefore, controlling the steam pressure to such a level that the pre-expanded beads can be fused together may be performed independently or in combination with controlling the time of the exhausting step in general steam supply procedures, i.e., the first cross steaming step, the second cross steaming step, and the autoclave step (main heating). If the steam pressure is too high or if the heating step time is too long, the shrinkage of the foam will tend to increase.

After the pre-expanded beads are heated, expanded, and fused in this way, cooling water is sprayed onto the female and male mold parts 41 and 51 from the back side to cool the in-mold foam molded article 1AA. Subsequently, the female and male mold parts 41 and 51 are opened, so that the in-mold foam molded article 1AA is obtained, which includes two divided foam parts 4AA separated by the dividing space 5AA and connected by the insert member 3AA that has been embedded over both divided foam parts 4AA by the insert molding. After the release from the mold, the divided foam parts 4AA of the in-mold foam molded article 1AA temporarily shrink and then return to the original shape. In this process, the divided foam parts 4AA are allowed to shrink in the longitudinal direction of the in-mold foam molded article 1AA as the space between the adjacent divided foam parts 4AA becomes wider, and the shrinking is not inhibited by the insert member 3AA. This prevents warping of the in-mold foam molded article 1AA along the longitudinal direction, and may prevent the in-mold foam molded article 1AA from warping into such a curved shape that as indicated by the virtual lines in FIG. 10B, both longitudinal ends of the in-mold foam molded article 1AA lift up while the longitudinal center of the in-mold foam molded article 1AA protrudes downward.

(Seat Core Material Produced Using First Type In-Mold Foam Molded Article 1B)

Next, a description will be given of an in-mold foam molded article 1BA and female and male mold parts 41A and 51A of a mold apparatus M2 for use in the forming the in-mold foam molded article 1BA in a case where the first type in-mold foam molded article 1B is used to form a seat core material for car back seats.

Figure 15:
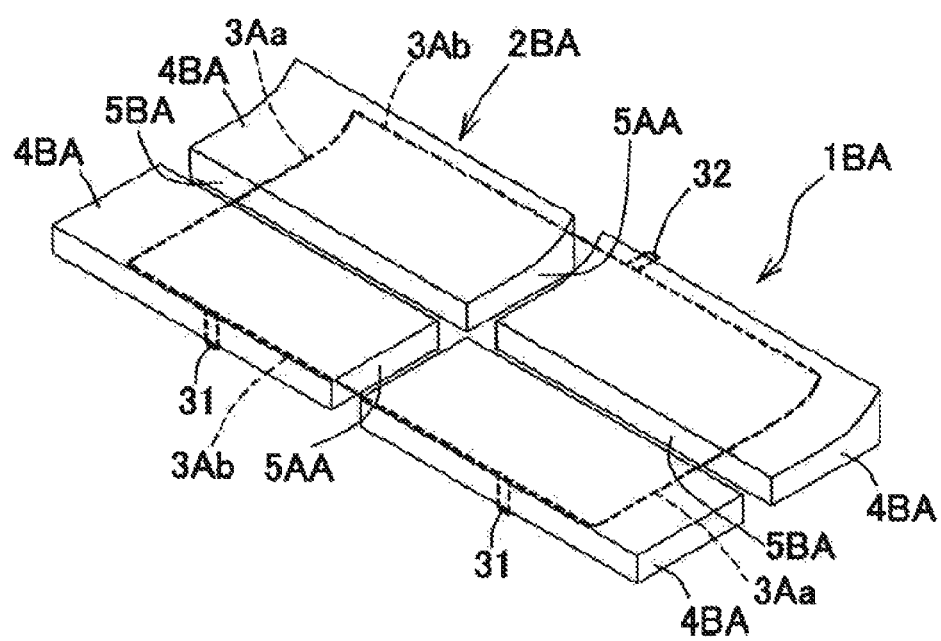
FIG. 15 is a perspective view of another first type in-mold foam molded article.
Figure 16C:
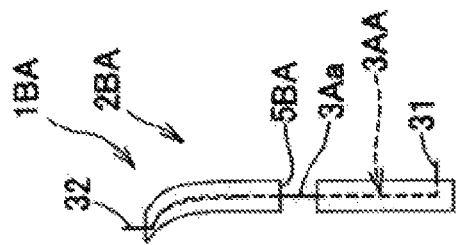
FIGS. 16A, 16B, and 16C are plan, front, and right-side views of the in-mold foam molded article of FIG. 15.
Figure 16A:
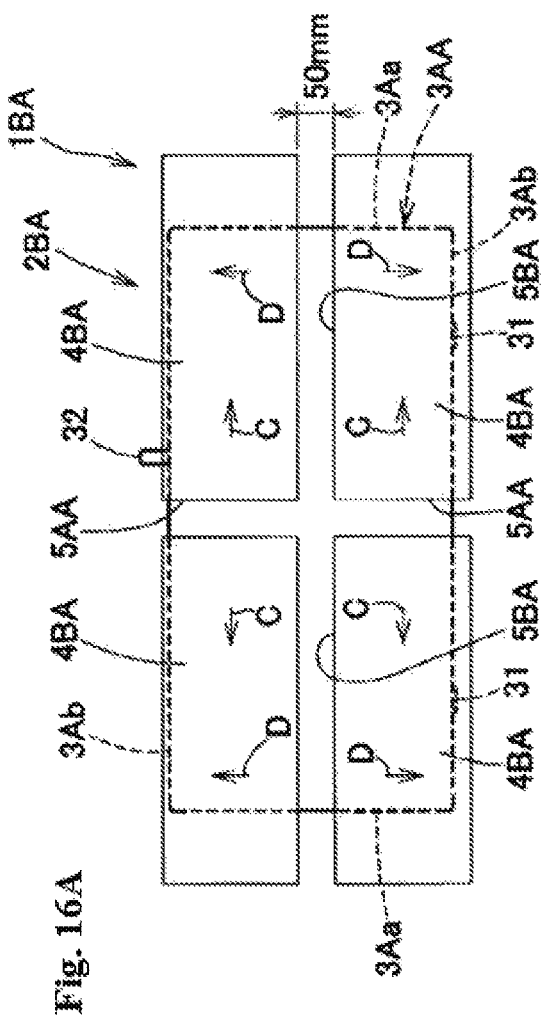
Figure 16B:
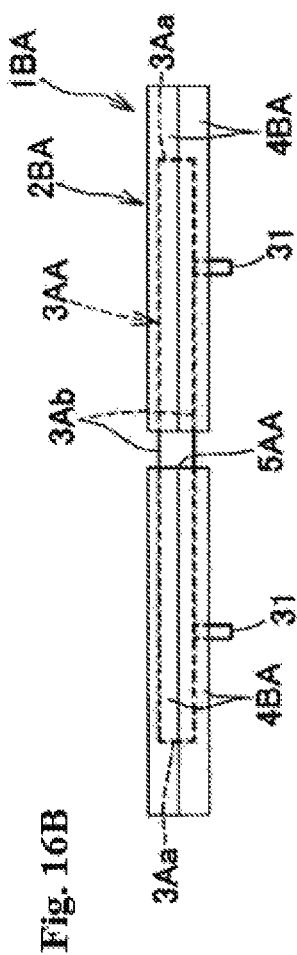

As illustrated in FIGS. 15 and 16, the first type in-mold foam molded article 1BA is configured similarly to the in-mold foam molded article 1AA illustrated in FIGS. 9 and 10, except that, a dividing space 5BA including a space extending in the longitudinal direction (left-right direction) is further formed at a portion in the transverse portion (front-back direction) of the foam body 2BA so that the foam body 2BA is divided into four divided foam parts 4BA by forming a cross-shaped dividing space in the foam body 2BA by the longitudinal and transverse dividing spaces 5AA and 5BA.

In the first type in-mold foam molded article 1BA, the pair of longitudinal portions 3Ab function as connecting portions 6 and the pair of transverse portions 3Aa function as a pair of movement resisting portions 7 for the divided foam parts 4BA located on both sides of the dividing space 5AA. Therefore, as the width of the dividing space 5AA increases, the divided foam parts 4BA located on both sides of the dividing space 5AA each independently shrink smoothly along the longitudinal portions 3Ab as connecting portions 6 toward the transverse portion 3Aa (as the movement resisting portion 7) side as indicated by the arrow C. In addition, the pair of transverse portions 3Aa function as connecting portions 6 and the pair of longitudinal portions 3Ab function as a pair of movement resisting portions 7 for the divided foam parts 4BA located on both sides of the dividing space 5BA. Therefore, as the width of the dividing space 5BA increases, the divided foam parts 4BA located on both sides of the dividing space 5BA each independently shrink smoothly along the transverse portions 3Aa as connecting portions 6 toward the longitudinal portion 3Ab (as the movement resisting portion 7) side as indicated by the arrow D. Thus, the occurrence of waring along the longitudinal and transverse directions is suppressed or prevented in the in-mold foam molded article 1BA.

Figure 17A:
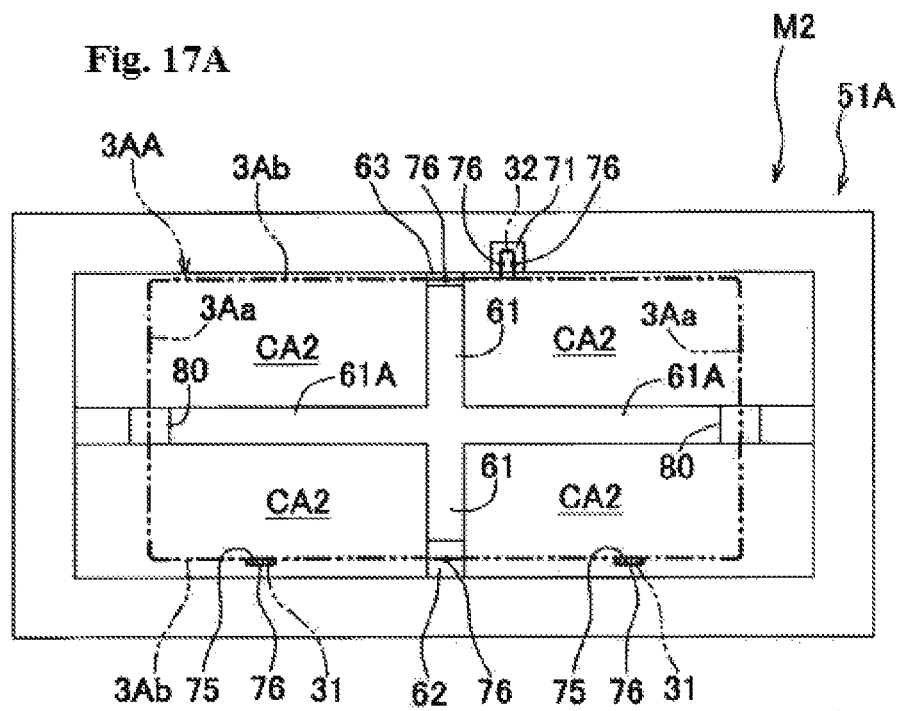
FIG. 17A is a molding surface-side front view of the male mold part of a mold for forming the in-mold foam molded article of FIG. 15.

As illustrated in FIG. 17A, the male mold part 51A for use in forming the in-mold foam molded article 1BA is configured similarly to the male mold part 51 of the mold apparatus M1 illustrated in FIG. 11A, except that a fitting protrusion 61A extending over the entire length in the longitudinal direction (left-right direction) is formed at the transverse center (the center along the front-back direction), the fitting protrusions 61 and 61A are joined in the form of a cross, and fourth receiving portions 80 protruding to the same height as the first receiving portion 62 are further provided continuously with the fitting protrusion 61A and adjacent to both ends of the fitting protrusion 61A to accommodate a portion in each of the left and right transverse portions 3Aa of the insert member 3AA.

Figure 17B:
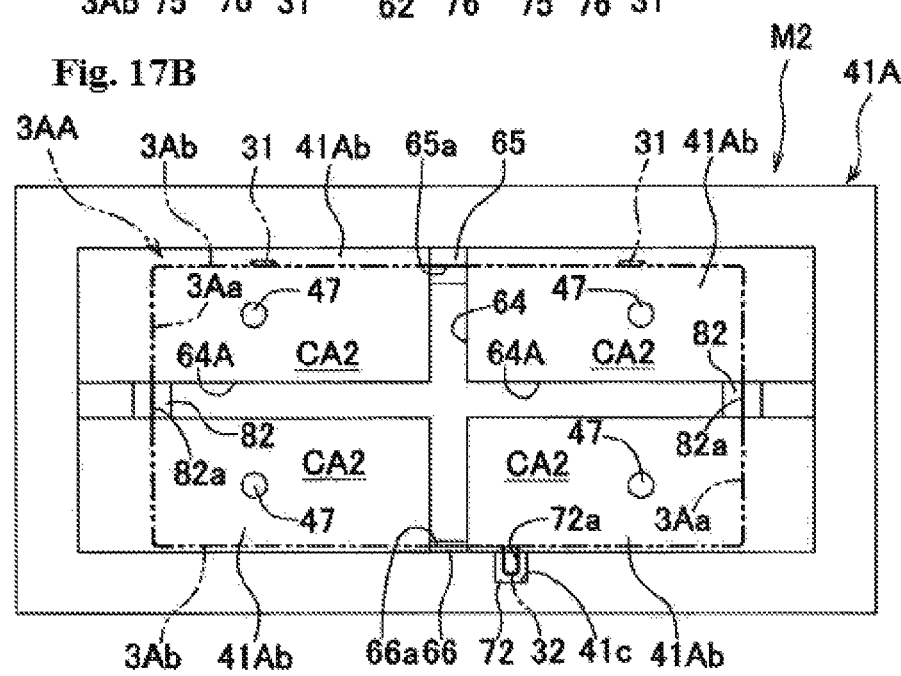
FIG. 17B is a molding surface-side front view of the female mold part of the mold for forming the in-mold foam molded article of FIG. 15.

As illustrated in FIG. 17B, the female mold part 41A for use in forming the in-mold foam molded article 1BA is configured similarly to the female mold part 41 of the mold apparatus M1 illustrated in FIG. 11B, except that a fitting recess 64A extending over the entire length in the longitudinal direction (left-right direction) is formed at the transverse center (the center along the front-back direction); the fitting recesses 64 and 64A are joined in the form of a cross; fourth blocks 82 are further installed adjacent to both ends of the fitting recess 64A to face a portion in each of the left and right transverse portions 3Aa of the insert member 3AA; fourth holding grooves 82a, into which the left and right transverse portions 3Aa of the insert member 3AA are to be fit, are formed on the tip faces of the fourth blocks 82; the fourth blocks 82 are guided in the mold opening/closing direction by guide rods (not shown) similarly to the first block 65 and constantly pushed toward the female mold part 41A side by means of spring members; and filling guns 47 are each provided at the center of each of four molding portions 41Ab of the female mold part 41A, which are partitioned by the fitting recesses 64 and 64A.

In the mold apparatus M2 including the male and female mold parts 51A and 41A, the male and female mold parts 51A and 41A are closed with the insert member 3AA being attached to the male mold part 51A similarly to the mold apparatus M1. In the closed mold apparatus M2, four molding spaces CA2 are formed between the male mold part 51A and the female mold part 41A by the fitting protrusions 61 and 61A, the first receiving portion 62 and the first block 65, the second receiving portion 63 and the second block 66, and the fourth receiving portion 80 and the fourth block 82. In addition, a portion in the front-side longitudinal portion 3Ab is held between the first receiving portion 62 and the first block 65, a portion in the front-side longitudinal portion 3Ab is held between the second receiving portion 63 and the second block 66, and portions in the left and right transverse portions 3Aa are each held between the fourth receiving portion 80 and the fourth block 82. Similarly to the mold apparatus M1, the pre-expanded beads are charged into the molding spaces CA2 and subjected to insert molding to form four divided foam parts 4BA with the insert member 3AA inserted in them.

(Seat Core Material Produced Using Second Type In-Mold Foam Molded Article 21A)

Next, a description will be given of an in-mold foam molded article 21AA and a mold apparatus M3 for use in the forming thereof in a case where the second type in-mold foam molded article 21A is used to form a seat core material for car back seats. In this case, the description will be given of a case where the insert member 3AA for the in-mold foam molded article 1AA described above is used as the insert member 23 for the in-mold foam molded article 21A.

Figure 18:
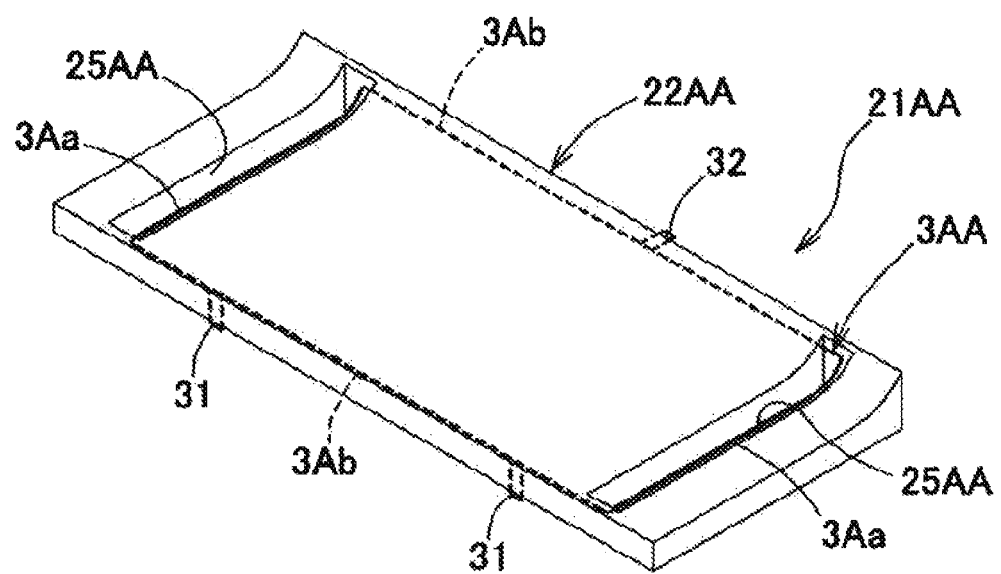
FIG. 18 is a perspective view of a second type in-mold foam molded article.

As illustrated in FIGS. 18 and 19, the second type in-mold foam molded article 21AA is configured similarly to the in-mold foam molded article 1AA illustrated in FIGS. 9 and 10, except that the foam body 22AA that is used does not have the dividing space 5AA for the in-mold foam molded article 1AA and the foam body 22AA has movement allowing spaces 25AA that each include a through hole slender in the transverse direction and are formed adjacent to both longitudinal ends of the foam body 22AA to expose both end portions of the longitudinal portions 3Ab of the insert member 3AA and the whole of the transverse portions 3Aa of the insert member 3AA to the outside.

After the in-mold foam molded article 21AA is released from the mold, as the foam body 22AA shrinks, each transverse portion 3Aa as the movement resisting portion 27 moves in each movement allowing space 25AA, so that the foam body 22AA smoothly shrinks in the direction of the arrow A along the longitudinal portion 3Ab as the connecting portion 26. In addition, after the shrinking, each movement resisting portion 27 also moves in each movement allowing space 25AA as the foam body 22AA returns to its original shape so that the foam body 22AA smoothly returns to its original shape along the longitudinal portion 3Ab as the connecting portion 26. After the release from the mold, therefore, the shrinking action of the foam body 22AA and the action of returning to the original shape go smoothly, which makes it possible to suppress or prevent the occurrence of warping in the in-mold foam molded article 21AA.

Figure 20A:
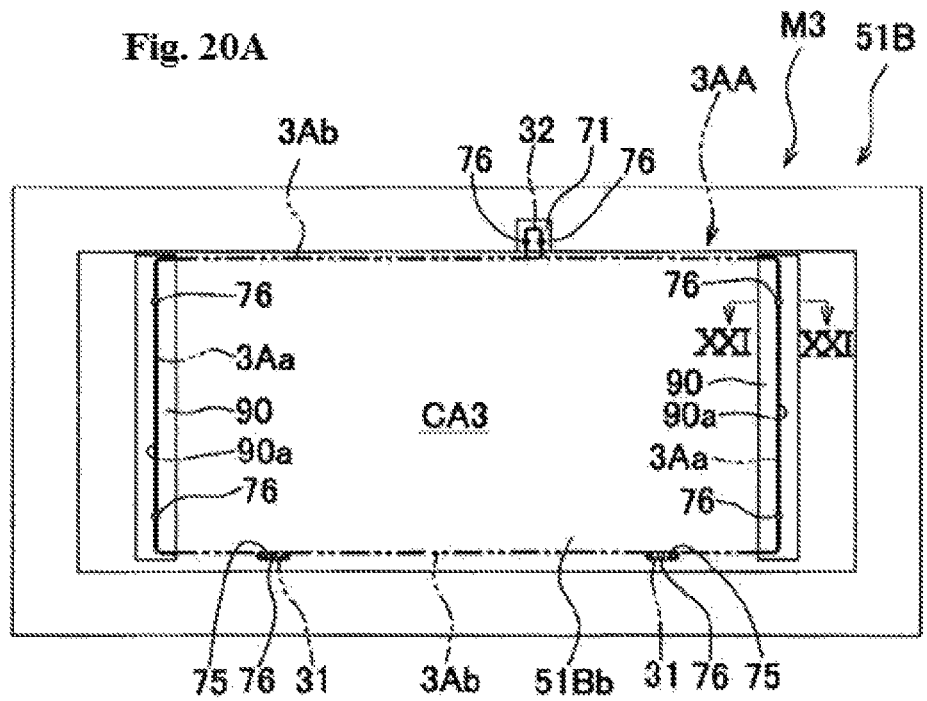
FIG. 20A is a molding surface-side front view of the male mold part of a mold for forming the in-mold foam molded article of FIG. 18.
Figure 21:
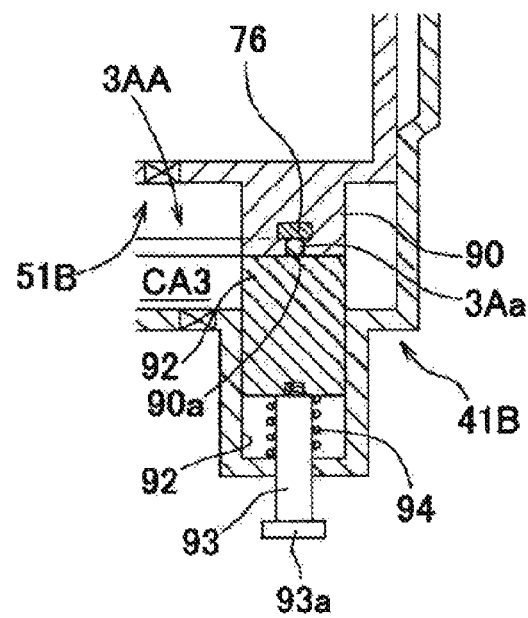
FIG. 21 is a cross-sectional view, along the XXI-XXI line in FIG. 20, of the closed state of the mold for forming the in-mold foam molded article of FIG. 18.

As illustrated in FIGS. 20A and 21, the male mold part 51B for use in forming the in-mold foam molded article 21AA is configured similarly to the male mold part 51 of the mold apparatus M1 illustrated in FIG. 11A, except that the lifting protrusion 61 and the first and second receiving portions 62 and 63 of the male mold part 51 are omitted; protrusions 90 extending in the transverse direction are formed at both left and right ends of the molding portion 51Bb of the male mold part 51B to protrude to a position where the insert member 3AA is loaded; a fitting groove 90a for holding left-end portions of the front- and back-side longitudinal portions 3Ab of the insert member 3AA and for holding the left-side transverse portion 3Aa of the insert member 3AA is formed at the tip face of the left-side protrusion 90; and a fitting groove 90a for holding right-end portions of the front- and back-side longitudinal portions 3Ab of the insert member 3AA and for holding the right-side transverse portion 3Aa of the insert member 3AA is formed at the tip face of the right-side protrusion 90.

Figure 20B:
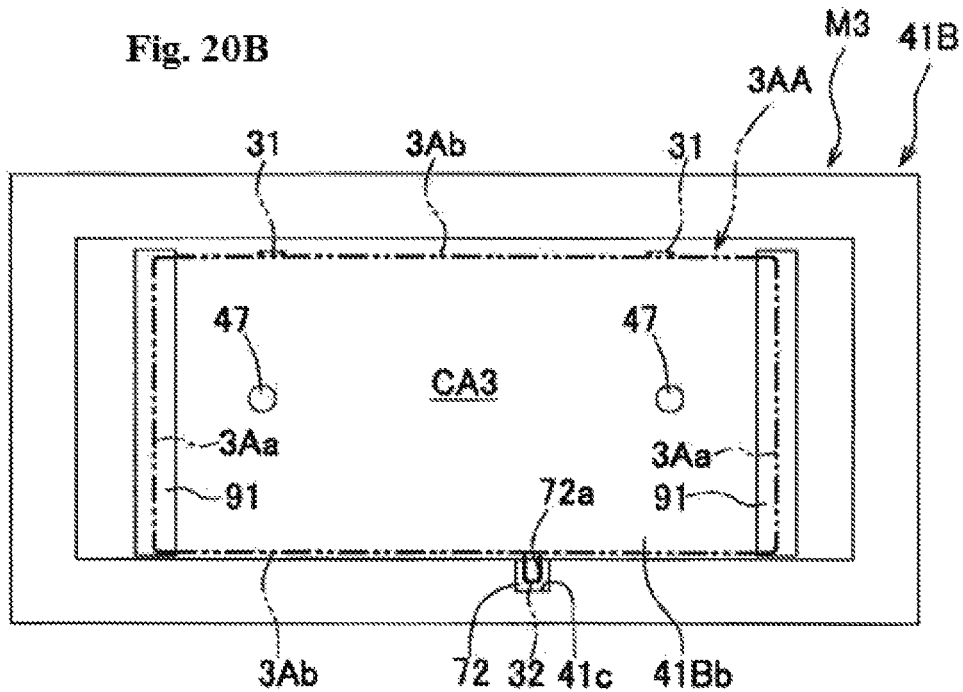
FIG. 20B is a molding surface-side front view of the female mold part of the mold for forming the in-mold foam molded article of FIG. 18.

As illustrated in FIGS. 20B and 21, the female mold part 41B for use in forming the in-mold foam molded article 21AA is configured similarly to the male mold part 51 of the mold apparatus M1 illustrated in FIG. 11B, except that the fitting recess 64 and the first and second blocks 65 and 66 of the female mold part 41 are omitted; the longitudinal center portion of the male mold part 51B-side surface of the molding portion 41Bb has a continuous flat surface; a pair of left and right recesses 91 are formed at both left- and right-side portions of the molding portion 41Bb of the female mold part 41B to face the protrusions 90; blocks 92 are held, movably in the mold opening/closing direction, in both recesses 91; the blocks 92 are guided movably in the mold opening/closing direction by guide rods 93 and constantly pushed toward the male mold part 51B side by spring members 94; regulation portions 93a are provided to the guide rods 93 to regulate the protruding positions; and when the mold parts are closed, the tip of each block 92 is allowed to come into contact with the tip of each protrusion 90, so that the protrusions 90 and the blocks 92 allow the foam body 22AA to have a pair of left and right movement allowing spaces 25AA each including a through hole.

In the mold apparatus M3, the left and right fasteners 31 are inserted into the left and right recesses 75, the left- and right-side portions of the insert member 3AA are fit into the left and right fitting grooves 90a, and the insert member 3AA is attached to the male mold part 51B by means of the permanent magnets 76. In this state, the male and female mold parts 51B and 41B are closed. Similarly to the mold apparatus M1 described above, the pre-expanded beads are charged into the molding space CA3 and then subjected to insert molding to form the foam body 22AA with the insert member 3AA inserted therein.

Figure 22:
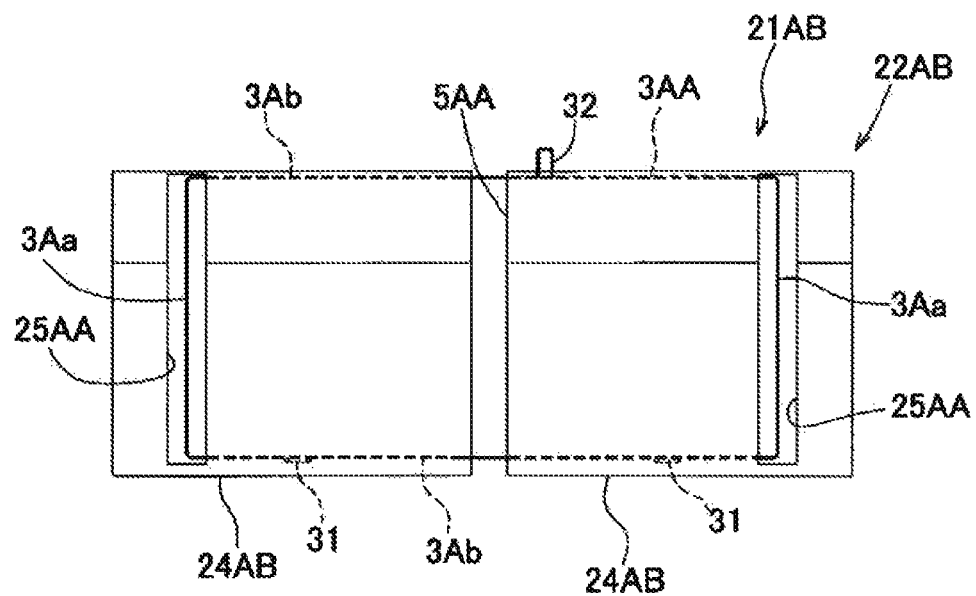
FIG. 22 is a plan view of an in-mold foam molded article in which the first and second types are combined.

As illustrated in FIG. 22, an in-mold foam molded article 21AB may also be provided including: a foam body 22AB as an alternative to the foam body 22AA of the second type in-mold foam molded article 21AA; and the insert member 3AA inserted in the foam body 22AB by insert molding, in which the foam body 22AB has movement allowing spaces 25AA each including a through hole and also has, similarly to the first type in-mold foam molded article 1AA, a dividing space 5AA including a space formed at a longitudinal middle portion and extending in the transverse direction, by which the foam body 22AB is divided into two divided foam parts 24AB. In the in-mold foam molded articles 1AA, 1BA, 21AA, and 21AB, the fasteners 31 and 32 also function as movement resisting portions 27. In one or more embodiments, therefore, movement allowing spaces 25 may also be formed in the foam bodies 2AA, 2BA, 22AA, and 22AB to entirely hold the fasteners 31 and 32 in such a way that the fasteners 31 and 32 are entirely exposed to the outside.

While the embodiments have been described with reference to cases where vehicle seat core materials are formed by molding, one or more embodiments of the present invention may also be applied to mold apparatuses for forming molded articles with any other structures, such as vehicle bumper core materials and car interior components such as headrest core materials or for forming various molded articles for any applications other than vehicles.

(Evaluation Test)

Next, a description will be given of the results of analysis of the amount of warping in in-mold foam molded articles after the release from the mold. The analysis was performed using ANSYS manufactured by Cybernet Systems Co., Ltd.

In Example 1, the in-mold foam molded article 1AA with the dimensions of each portion specified as shown in FIG. 10 was formed, in which the pre-expanded beads used were polypropylene-based resin pre-expanded beads, and the insert member 3AA and the fasteners 31 and 32 used were each made of an iron wire with a diameter of 3.2 mm.

In Example 2, the in-mold foam molded article 1BA shown in FIG. 16 was formed in a similar manner as in Example 1, except that a 50-mm-wide dividing space 5BA was formed at a portion in the transverse portion of the in-mold foam molded article 1AA of Example 1.

In Example 3, the in-mold foam molded article 21AA shown in FIG. 19 was formed in a similar manner as in Example 1, except that the dividing space 5AA was omitted from the in-mold foam molded article 1AA of Example 1 and that movement allowing spaces 25AA including a pair of left and right through holes with a width of 50 mm, a length of 475 mm, and a depth of 30 mm were formed so that both end portions of the longitudinal portions 3Ab and the whole of the transverse portions 3Aa were placed.

In Example 4, the in-mold foam molded article 21AB shown in FIG. 22 was formed in a similar manner as in Example 3, except that the dividing space 5AA with a width of 50 mm was formed in a similar manner as in Example 1, at a portion in the transverse portion of the in-mold foam molded article 21AA of Example 3.

In Comparative Example 1, an in-mold foam molded article was formed in a similar manner as in Example 1, except that the dividing space 5AA was omitted from the in-mold foam molded article 1AA of Example 1.

In Reference Example 1, an in-mold foam molded article was formed in a similar manner as in Example 1, except that a slit was formed in place of the dividing space in the in-mold foam molded article of Example 1. The slit had a width of 50 mm and was formed in such a manner that the slit portion of the foam body had a thickness of 10 mm between the wire surface and the upper surface and a thickness of 10 mm between the wire surface and the lower surface.

After the release from the mold, warping in the in-mold foam molded articles of Examples 1 to 4 and Comparative Example 1 was analyzed using ANSYS manufactured by Cybernet Systems Co., Ltd., and the warping amount S (see FIG. 10) at the right end of each in-mold foam molded article was determined. In this case, the analysis was performed taking into account a shrinkage rate of 1%, at which the dimensions of the foam body will stabilize after the steps of molding the polypropylene-based resin pre-expanded beads in the mold, releasing the article from the mold, drying the article, and aging the article. The results are shown in Table 1.

TABLE 1

|  | Warping amount S (mm) |
| --- | --- |
| Example 1 | 9 |
| Example 2 | 6 |
| Example 3 | 7 |
| Example 4 | 2 |
| Reference Example 1 | 43 |
| Comparative Example 1 | 37 |

Table 1 shows that the warping amount S is significantly smaller in the in-mold foam molded articles of Examples 1 to 4 having a dividing space or a movement allowing space than in the in-mold foam molded article of Comparative Example 1.

While some embodiments of the present invention have been described above, it will be understood that the above embodiments are not intended at all to limit the present invention and the features of the embodiments may be changed or modified without departing from the gist of the present invention.

REFERENCE SIGNS LIST 1, 1A to 1D, 1F, 1H, 1J to 1M In-mold foam molded article
2, 2A, 2B, 2F, 2H, 2J to 2M Foam body
3, 3A, 3C, 3D, 3M Insert member
3Aa Transverse portion
3Ab Longitudinal portion
3Ma Transverse portion
3Mb Longitudinal portion
4, 4A, 4B, 4F, 4H, 4J to 4M Divided foam parts
5, 5A, 5B, 5F, 5H, 5J to 5M Dividing space
6 Connecting portion
7 Movement resisting portion
10 Metal wire
11 Metal wire
11a Bent portion
14 Foam joint
15 Reinforcing rod
21, 21A to 21D In-mold foam molded article
22, 22A to 22D Foam body
23, 23A Insert member
23a Transverse portion
23b Longitudinal portion
23D Insert member
25, 25A to 25D Movement allowing space
26 Connecting portion
27 Movement resisting portion
27C, 27D Movement resisting portion
1AA In-mold foam molded article
2AA Foam body
3AA Insert member
3Ab Longitudinal portion
4AA Divided foam part
5AA Dividing space
31 Fastener
32 Fastener
40 Female mold unit
41 Female mold part
41a Vent
41c Guide groove
42 Female mold housing
43 Female mold frame
44 Center plate
45 Female mold back plate
46 Female mold chamber
47 Filling gun
48a Steam supply pipe
48b Cooling water supply pipe
48c Drain pipe
48d Nozzle
49a to 49c Control valve
50 Male mold unit
51 Male mold part
51a Vent
51b Molding portion
52 Male mold housing
53 Male mold frame
54 Center plate
55 Male mold back plate
56 Male mold chamber
58a Steam supply pipe
58b Cooling water supply pipe
58c Drain pipe
58d Nozzle
59a to 59c Control valve
60 Partition means
61 Fitting protrusion
62 First receiving portion
63 Second receiving portion
64 Fitting recess
65 First block
65a First holding groove
66 Second block
66a Second holding groove
67 Guide rod
67a Regulation portion
68 Guide rod
68a Regulation portion
69 Spring member
70 Spring member
71 Third receiving portion
72 Third block
72a Holding groove
73 Guide rod
73a Regulation portion
74 Spring member
75 Recess
76 Permanent magnet
CA Molding space
M1 Mold apparatus for use in in-mold foam molding
1BA In-mold foam molded article
2BA Foam body
4BA Divided foam part
5BA Dividing space
41A Female mold part
41Ab Molding portion
51A Male mold part
61A Fitting protrusion
64A Fitting recess
80 Fourth receiving portion
82 Forth block
82a Holding groove
CA2 Molding space
M2 Mold apparatus
21AA In-mold foam molded article
22AA Foam body
25AA Movement allowing space
41B Female mold part
41Bb Molding portion
51B Male mold part
51Bb Molding portion
90 Protrusion
90a Fitting groove
91 Female mold part
92 Block
93 Guide rod
93a Regulation portion
94 Spring member
CA3 Molding space
M3 Mold apparatus
21AB In-mold foam molded article
22AB Foam body
24AB Divided foam part

What is claimed is:

1. An in-mold foam molded article comprising:
a foam body comprising olefin-based resin pre-expanded beads; and
an insert member comprising an elongated connecting portion and movement resisting portions provided apart from one another in the elongated connecting portion, the insert member being subjected to insert molding upon in-mold foam molding using the olefin-based resin pre-expanded beads;

wherein the foam body has a movement facilitating structure that facilitates relative movement between the insert member and the foam body during shrinkage of the in-mold foam molded article after release from a mold;

wherein the movement facilitating structure comprises:
  a dividing space provided along a direction crossing the elongated connecting portion, wherein the dividing space divides the foam body into a plurality of divided foam parts; and
  a movement allowing space that allows relative movement between the foam body and each of the movement resisting portions.

2. An in-mold foam molded article comprising:
a foam body comprising olefin-based resin pre-expanded beads; and
an insert member comprising an elongated connecting portion and movement resisting portions provided apart from one another in the elongated connecting portion, the insert member being subjected to insert molding upon in-mold foam molding using the olefin-based resin pre-expanded beads;
wherein the foam body has a movement facilitating structure that facilitates relative movement between the insert member and the foam body during shrinkage of the in-mold foam molded article after release from a mold;
the movement facilitating structure comprises a dividing space provided along a direction crossing the elongated connecting portion, wherein the dividing space divides the foam body into a plurality of divided foam parts.

3. The in-mold foam molded article according to claim 2, wherein the insert member has a portion exposed to an area between the plurality of divided foam parts.

4. The in-mold foam molded article according to claim 2, wherein the insert member has a loop-shaped portion.

5. The in-mold foam molded article according to claim 2, wherein the plurality of divided foam parts are partially integrally joined by at least one foam body joint.

6. An in-mold foam molded article comprising:
a foam body including olefin-based resin pre-expanded beads; and
an insert member including an elongated connecting portion and movement resisting portions provided apart from one another in the elongated connecting portion, the insert member being subjected to insert molding upon in-mold foam molding using the olefin-based resin pre-expanded beads;
wherein the insert member includes a loop-shaped portion having a pair of transverse portions and a pair of longitudinal portions, and the foam body has a movement facilitating structure that facilitates relative movement between the insert member and the foam body during shrinkage of the in-mold foam molded article after release from a mold,
the movement facilitating structure includes a movement allowing space that allows relative movement between the foam body and each of the movement resisting portions, and
the movement allowing space is one of (i) a movement allowing space that allows the pair of transverse portions which function as movement resisting portions to be entirely exposed to an outside, and both ends of the pair of longitudinal portions, which function as connecting portions, to be exposed to the outside, and (ii) a movement allowing space that allows the pair of longitudinal portions, which function as the movement resisting portions, to be entirely exposed to the outside, and both ends of the pair of transverse portions, which function as the connecting portions, to be exposed to the outside.

7. The in-mold foam molded article according to claim 6, wherein the movement allowing space has a size that allows each of the movement resisting portions to be placed in the movement allowing space before and after shrinkage of the in-mold foam molded article after release from the mold.

8. An in-mold foam molded article comprising:
a foam body comprising olefin-based resin pre-expanded beads; and
an insert member comprising an elongated connecting portion and movement resisting portions provided apart from one another in the elongated connecting portion, the insert member being subjected to insert molding upon in-mold foam molding using the olefin-based resin pre-expanded beads;
wherein the foam body has a movement facilitating structure that facilitates relative movement between the insert member and the foam body during shrinkage of the in-mold foam molded article after release from a mold;
the movement facilitating structure comprises:
  a dividing space provided along a direction crossing the elongated connecting portion, wherein the dividing space divides the foam body into a plurality of divided foam parts; and
  a movement allowing space that allows relative movement between the foam body and each of the movement resisting portions.

9. The in-mold foam molded article according to claim 8, wherein the insert member has a portion exposed to an area between the plurality of divided foam parts.

10. The in-mold foam molded article according to claim 8, wherein the movement allowing space has a size that allows each of the movement resisting portions to be placed in the movement allowing space before and after shrinkage of the in-mold foam molded article after release from the mold.

11. The in-mold foam molded article according to claim 8, wherein the plurality of divided foam parts are partially integrally joined by at least one foam body joint.

12. The in mold foam molded article according to claim 8, wherein the insert member has a loop-shaped portion.

* * * * *